US009385862B2

(12) United States Patent
Escott et al.

(10) Patent No.: US 9,385,862 B2
(45) Date of Patent: Jul. 5, 2016

(54) METHOD AND APPARATUS FOR BINDING SUBSCRIBER AUTHENTICATION AND DEVICE AUTHENTICATION IN COMMUNICATION SYSTEMS

(75) Inventors: Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 13/161,336

(22) Filed: Jun. 15, 2011

(65) Prior Publication Data

US 2011/0314287 A1 Dec. 22, 2011

Related U.S. Application Data

(60) Provisional application No. 61/355,423, filed on Jun. 16, 2010.

(51) Int. Cl.
*H04L 9/08* (2006.01)
*H04L 29/06* (2006.01)
(Continued)

(52) U.S. Cl.
CPC ............ *H04L 9/0816* (2013.01); *H04L 63/061* (2013.01); *H04L 63/0823* (2013.01);
(Continued)

(58) Field of Classification Search
CPC ....... H04L 9/32; H04L 9/3273; H04L 9/0813; H04L 9/0838; H04L 9/0844; H04L 63/061; H04L 63/0823; H04L 63/0853; H04L 2463/061; H04L 2463/082; H04L 9/3271; H04L 9/0816; H04W 12/04; H04W 88/02

USPC ......................................................... 713/171
See application file for complete search history.

(56) References Cited

U.S. PATENT DOCUMENTS 6,408,175 B1 6/2002 Park
6,826,690 B1 11/2004 Hind et al.
(Continued)

FOREIGN PATENT DOCUMENTS

CN 1225226 A 8/1999
CN 1684411 A 10/2005
(Continued)

OTHER PUBLICATIONS

3GPP TS 33.401 V10.0.0, 3rd Generation Partnership Project; Technical Specification Group Services and System Aspects: 3GPP System Architecture Evolution (SAE) Security architecture (Release 10) (Mar. 2011).
(Continued)

*Primary Examiner* — Jung Kim
*Assistant Examiner* — Ngoc D Nguyen
(74) *Attorney, Agent, or Firm* — Won Tae C. Kim

(57) ABSTRACT

An authentication method is provided between a device (e.g., a client device or access terminal) and a network entity. A removable storage device may be coupled to the device and stores a subscriber-specific key that may be used for subscriber authentication. A secure storage device may be coupled to the device and stores a device-specific key used for device authentication. Subscriber authentication may be performed between the device and a network entity. Device authentication may also be performed of the device with the network entity. A security key may then be generated that binds the subscriber authentication and the device authentication. The security key may be used to secure communications between the device and a serving network.

49 Claims, 13 Drawing Sheets

(51) Int. Cl.
*H04W 12/04* (2009.01)
*H04L 9/32* (2006.01)
*H04W 12/06* (2009.01)
*H04W 88/02* (2009.01)

(52) U.S. Cl.
CPC ........... *H04L63/0853* (2013.01); *H04W 12/04* (2013.01); *H04L 9/0813* (2013.01); *H04L 9/0838* (2013.01); *H04L 9/0844* (2013.01); *H04L 9/32* (2013.01); *H04L 9/3271* (2013.01); *H04L 9/3273* (2013.01); *H04L 2463/061* (2013.01); *H04L 2463/082* (2013.01); *H04W 12/06* (2013.01); *H04W 88/02* (2013.01)

(56) References Cited

U.S. PATENT DOCUMENTS

| | | |
|---|---|---|
| 7,203,836 B1 | 4/2007 | Maringer et al. |
| 7,424,543 B2 | 9/2008 | Rice et al. |
| 7,769,175 B2 | 8/2010 | Bajar et al. |
| 7,966,000 B2 | 6/2011 | Semple et al. |
| 8,019,989 B2 * | 9/2011 | Bosler .................. 713/156 |
| 2002/0061748 A1 | 5/2002 | Nakakita et al. |
| 2002/0073229 A1 | 6/2002 | Hayashi |
| 2002/0091933 A1 | 7/2002 | Quick et al. |
| 2004/0111616 A1 | 6/2004 | Adi |
| 2005/0251671 A1 | 11/2005 | Ouyang et al. |
| 2005/0251681 A1 * | 11/2005 | Robles et al. .................. 713/172 |
| 2005/0289643 A1 | 12/2005 | Sato et al. |
| 2006/0059549 A1 | 3/2006 | Suzuki et al. |
| 2006/0089123 A1 | 4/2006 | Frank |
| 2006/0107036 A1 | 5/2006 | Randle et al. |
| 2006/0120531 A1 | 6/2006 | Semple et al. |
| 2006/0291422 A1 | 12/2006 | Rochford |
| 2007/0016780 A1 * | 1/2007 | Lee et al. ....................... 713/171 |
| 2007/0121947 A1 * | 5/2007 | Sood et al. .................... 380/277 |
| 2007/0142086 A1 | 6/2007 | Boursier et al. |
| 2008/0022104 A1 | 1/2008 | Deishi |
| 2008/0040606 A1 | 2/2008 | Narayanan et al. |
| 2008/0101275 A1 | 5/2008 | Kang et al. |
| 2008/0162939 A1 | 7/2008 | Lee et al. |
| 2008/0267153 A1 | 10/2008 | Mukherjee et al. |
| 2008/0295159 A1 | 11/2008 | Sentinelli |
| 2009/0024751 A1 * | 1/2009 | Taniguchi et al. ............. 709/229 |
| 2009/0074189 A1 * | 3/2009 | Ryu et al. ..................... 380/277 |
| 2009/0164788 A1 * | 6/2009 | Cho et al. ..................... 713/175 |
| 2009/0172798 A1 | 7/2009 | Upp |
| 2009/0227234 A1 | 9/2009 | Bosch et al. |
| 2009/0233609 A1 | 9/2009 | Iun et al. |
| 2009/0239503 A1 | 9/2009 | Smeets |
| 2009/0249069 A1 | 10/2009 | Daskalopoulos et al. |
| 2009/0258631 A1 | 10/2009 | Forsberg et al. |
| 2010/0046418 A1 | 2/2010 | Horn et al. |
| 2010/0103452 A1 | 4/2010 | Ulupinar et al. |
| 2010/0125732 A1 | 5/2010 | Cha et al. |
| 2010/0167740 A1 | 7/2010 | Vakil et al. |
| 2010/0311419 A1 | 12/2010 | Bi |
| 2010/0313024 A1 | 12/2010 | Weniger et al. |
| 2010/0322148 A1 | 12/2010 | Liu et al. |
| 2011/0002314 A1 | 1/2011 | Choi et al. |
| 2011/0004762 A1 * | 1/2011 | Horn ............................. 713/171 |
| 2011/0038480 A1 | 2/2011 | Lin |
| 2011/0314522 A1 | 12/2011 | Palanigounder et al. |
| 2012/0002594 A1 | 1/2012 | Racz et al. |
| 2012/0044836 A1 | 2/2012 | Sivavakeesar et al. |
| 2012/0100832 A1 | 4/2012 | Mao et al. |
| 2012/0144202 A1 | 6/2012 | Counterman |
| 2012/0233685 A1 | 9/2012 | Palanigounder et al. |
| 2013/0036223 A1 | 2/2013 | Du et al. |

FOREIGN PATENT DOCUMENTS

| | | |
|---|---|---|
| CN | 101208901 A | 6/2008 |
| CN | 101232378 A | 7/2008 |
| CN | 101292558 A | 10/2008 |
| CN | 101448257 A | 6/2009 |
| CN | 101640887 A | 2/2010 |
| CN | 101945386 A | 1/2011 |
| EP | 1650903 A1 | 4/2006 |
| EP | 1739903 A1 | 1/2007 |
| EP | 2234366 A1 | 9/2010 |
| EP | 2291015 A1 | 3/2011 |
| JP | 2004318398 A | 11/2004 |
| JP | 3628250 | 3/2005 |
| JP | 2005529569 A | 9/2005 |
| JP | 2005311904 A | 11/2005 |
| JP | 2006011989 A | 1/2006 |
| JP | 2006065690 A | 3/2006 |
| JP | 2006121526 A | 5/2006 |
| JP | 2006345205 A | 12/2006 |
| JP | 2008054290 A | 3/2008 |
| JP | 2008547350 A | 12/2008 |
| JP | 2009124684 A | 6/2009 |
| JP | 2011523105 A | 8/2011 |
| JP | 2011526097 A | 9/2011 |
| KR | 20070003484 A | 1/2007 |
| KR | 20070042243 A | 4/2007 |
| TW | 200950382 A | 12/2009 |
| WO | 2007004824 | 1/2007 |
| WO | WO-2007121190 A2 | 10/2007 |
| WO | WO-2009038522 A1 | 3/2009 |
| WO | WO-2009141919 A1 | 11/2009 |
| WO | 2009148261 A2 | 12/2009 |
| WO | WO-2010027821 A2 | 3/2010 |
| WO | WO-2010035202 A1 | 4/2010 |
| WO | WO-2010048565 A1 | 4/2010 |

OTHER PUBLICATIONS

3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Standard; 3GPP TR 36.806, 3rd Generation Partnership Project (3GPP), Mobile Competence Centre; 650, Route des Lucioles; F-06921 Sophia-Antipolis Cedex; France, No. V9.0.0, Apr. 21, 2010, pp. 1-34, XP050402561, [retrieved on Apr. 21, 2010].

Panasonic: "Summary of Email discussion [69#31] LTE: Relay configuration at startup/subframe reconfiguration", 3GPP Draft; R2-102085, 3rd Generation Partnership Project (3GPP), Mobile Competence Centre; 650, Route des Lucioles; F-06921 Sophia-Antipolis Cedex; France, vol. RAN WG2, No. Beijing, china; 20100412, Apr. 6, 2010, XP050422555, [retrieved on Apr. 6, 2010].

Taiwan Search Report—TW100121082—TIPO—Aug. 9, 2013.

3GPP: "3rd Generation Partnership Project; Technical Specification Group Service and Systems Aspects: Security of H(e)NB; (Release 8)", 3GPP TR 33.820 V8.3.0, vol. 33.820, No. V8.3.0 Dec. 1, 2009, pp. 1-99, XP002650893, Retrieved from the Internet: URL:http://www.quintillion.co.jp/3GPP/Spec s/33820-830.pdf Sections 6 and 7.

Calhoun P., et al., "Diameter Base Protocol RFC 3588", Internet Engineering Task Force (IETF), Sep. 2003, XP015009370.

Eronen P., et al., "Diameter Extensible Authentication RFC 4072", Internet Engineering Task Force (IETF) Aug. 2005, XP015041927.

Funk P., et al., "Extensible Authentication Protocol Tunneled Transport Layer Security Authenticated Protocol Version 0 (EAP-TTLSv0); RFC 5281", Internet Engineering Task Force (IETF), Aug. 2008, XP015060268.

International Search Report and Written Opinion—PCT/US2011/040777—ISA/EPO—Oct. 28, 2011.

Simon D., et al., "The EAP-TLS Authentication Protocol; RFC 5216", Internet Engineering Task Force (IETF), Mar. 1, 2008, XP015055258.

Chen, et al. "A Secure Relay-Assisted Handover Protocol for Proxy Mobile IPv6 in 3GPP LTE Networks," Wireless Personal Communications, 2010. <http://www.csie.ntpu.edu.tw/~yschen/conpapers/wcnc2010.pdf>.

3GPP: "3rd Generation Partnership Project; Technical Specification Group Services and System Aspects; Feasibility study on LTE relay node security Release 10", 3GPP TR 33.816, Mar. 2011, V10.0.0, pp. 45-48, & 59-62.

(56) References Cited

OTHER PUBLICATIONS

Umezawa T., et al., "A Virtual Networking Method using NFC Mobile," IEICE Technical Report, Japan, The Institute of Electronics, Information and Communication Engineers, Sep. 3, 2009, vol. 109, No. 191, pp. 1-6.

Kaji Y. et al., "Declare-Next Authentication Method—Secure Use of Insecure Magnetic Cards", Technical Report of the Institute of Electronics, Information and Communication Engineers, Japan, The Institute of Electronics, Information and Communication Engineers [Online], Dec. 15, 1995, vol. 95, No. 423, pp. 21 to 28, [searched on Feb. 24, 2014, Internet, URL, <http://ci.nii.ac.jp/els/110003297047.pdf?id=ART0003723813&type=pdf&lang=jp&host=cinii&order_no=&ppv_type=0&lang_sw=&no=1393216512&cp=>.

Huawei: "Key Handling in Idle-Active Transition", 3GPP TSG SA WG3 Security—S3#48, Jul. 13, 2007, pp. 1-7, URL: http://www.3gpp.org/ftp/tsg_sa/WG2_Arch/TSGS2_58_Orlando/Docs/S3-070517.zip.

* cited by examiner

METHOD AND APPARATUS FOR BINDING SUBSCRIBER AUTHENTICATION AND DEVICE AUTHENTICATION IN COMMUNICATION SYSTEMS

CLAIM OF PRIORITY UNDER 35 U.S.C. §119

The present Application for patent claims priority to U.S. Provisional Application No. 61/355,423 entitled "Apparatus and Method for Device Authentication in 3GPP Systems" filed Jun. 16, 2010, and assigned to the assignee hereof and hereby expressly incorporated by reference herein.

BACKGROUND

1. Field

Various features relate to communications systems and, more particularly, to the authentication of devices, such as relay nodes and machine-to-machine devices, employed in a wired and/or wireless communications system.

2. Background

Modern wireless networks may include relay nodes and/or access terminals, cumulatively referred to here as devices. In order for such a device to function properly, the device is often provisioned/configured with operational and subscriber security credentials before the device is put into operation. Such subscriber security credentials may be used to, for example, authenticate the device prior providing wireless service or access and, in some cases, may be stored in a module that irremovably couples to its host device. A risk exists that subscriber security credentials may be removed from an authenticated device and placed in an unauthorized device. In the case of a relay node, this may allow an unauthorized relay node to surreptitiously access transmissions, for example, between an access node and one or more access terminals and/or to obtain free access to network services. This risk or vulnerability also exists in the case of machine-to-machine (M2M) devices in that valid subscriber credentials (e.g., authentication and key agreement—(AKA) parameters in a removable Universal Integrated Circuit Card (UICC)) in a M2M device could be transferred to another device in order to gain free network access. A related vulnerability exists in that it is not necessary to have physical access to the M2M device itself. Access to the data (e.g., the security keys resulting from authentication) that is going across a M2M device interface (e.g., host device to UICC interface) is sufficient to gain access to security keys and expose data secured by said keys.

A similar issue exists if an operator wishes to control which devices are allowed to access their network.

Consequently, there is a need to provide additional security for devices to address these and other vulnerabilities and risks.

SUMMARY

A method and apparatus are provided for securing a device by binding subscriber authentication and device authentication to generate a security key.

According to a first aspect, a method operational in a device is provided that binds subscriber and device authentication. The device may start by sending an attach request to the network entity, the attach request including an indication of device authentication capabilities of the device. Subscriber authentication may be performed by the device with a network entity. For instance, subscriber authentication may be based on an authentication key agreement exchange between the device and the network entity. The device may also perform device authentication with the network entity. For instance, device authentication may be based on a challenge-response exchange between the device and the network entity.

A security key may then be generated that binds the subscriber authentication and the device authentication. The security key may be generated as a function of at least a first key obtained from subscriber authentication and a second key obtained from device authentication. Additionally, the security key may also be a function of a network nonce and a device nonce. The security key may then be used to secure communications between the device and a serving network. Note that the security key may be separately generated by the device and the network entity, so it is not transmitted over the air.

According to one implementation, subscriber authentication may be performed by a first authentication server that is part of the network entity, while device authentication may be performed by a second authentication server that is part of the network entity.

In one example, device authentication may be performed by using a shared secret key to encrypt/decrypt certain exchanges between the device and the network entity. In another example, device authentication may be performed by: (a) receiving data from the network entity that is encrypted with a public key of the device; (b) using a corresponding private key to decrypt the encrypted data; and/or (c) subsequently proving to the network entity that the device has knowledge of the data.

According to one aspect, device authentication may be secured by at least one key generated during the subscriber authentication.

In various implementations, subscriber authentication and device authentication may be concurrently performed in combined message exchanges or subscriber authentication may be performed in an earlier and separate security exchange from the device authentication.

According to one feature, a subscriber-specific key may be provisioned on the device as part of a service agreement, where the subscriber-specific key is used for the subscriber authentication. Similarly, a device-specific key may be provisioned in the device during manufacturing, where the device-specific key is used for the device authentication.

In one implementation, device may be a relay node that appears as an access terminal to the network entity and appears as a network device to one or more access terminals. In another implementation, the device may be an access terminal.

According to one example, the device may include a communication interface coupled to a processing circuit. The processing circuit may be adapted to: (a) perform subscriber authentication with a network entity; (b) perform device authentication of the device with the network entity; (c) generate a security key that binds the subscriber authentication and the device authentication; and/or (d) use the security key to secure communications between the device and a serving network.

According to yet another example, a processor-readable medium comprising instructions operational on a device may be provided. When executed by a processor, these instructions may causes the processor to: (a) perform subscriber authentication with a network entity; (b) perform device authentication of the device with the network entity; (c) generate a security key that binds the subscriber authentication and the device authentication; and/or (d) use the security key to secure communications between the device and a serving network.

According to another aspect, method operational in a network entity is provided. The network entity may receive an attach request from the device, the attach request including an indication of device authentication capabilities of the device. The network entity may perform subscriber authentication with a device. Likewise, the network entity may perform device authentication of the device. A security key may then be generated by the network entity that binds the subscriber authentication and the device authentication. The security key may then be used to secure communications between the network entity and the device. Note that, to prevent over the air transmission of the security key, the security key may be separately generated by the device and the network entity.

In one example, subscriber authentication may be based on an authentication key agreement exchange between the network entity and the device. Device authentication may be based on a challenge-response exchange between the network entity and the device.

In one implementation, device authentication may include: (a) receiving a certificate from the device; and (b) verifying the certificate associated with the device has not been revoked.

In one implementation, so as to prevent snooping during the device authentication process, device authentication may be secured by at least one key generated during an earlier subscriber authentication.

According to various examples, subscriber authentication and device authentication may be concurrently performed in combined message exchanges or authentication is performed in an earlier and separate security exchange from the device authentication.

In another example, the security key may be generated as a function of at least a first key obtained from subscriber authentication and a second key obtained from device authentication.

In one implementation, the network entity may obtain a subscriber-specific as part of a service agreement, the subscriber-specific key used for the subscriber authentication. Similarly, the network entity may obtain a device-specific key for the device, the device-specific key used for the device authentication.

In one implementation, the network entity may comprise a communication interface coupled to a processing circuit. The processing circuit may be adapted to: (a) perform subscriber authentication with a device; (b) perform device authentication of the device; (c) generate a security key that binds the subscriber authentication and the device authentication; and/ or (d) use the security key to secure communications between the network entity and the device.

In one implementation, a processor-readable medium comprising instructions operational on a network entity is provided. When executed by a processor, these instructions may cause the processor to: (a) perform subscriber authentication with a device; (b) perform device authentication of the device; (c) generate a security key that binds the subscriber authentication and the device authentication; and/or (d) use the security key to secure communications between the network entity and the device.

DETAILED DESCRIPTION

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation.

Overview

An authentication method is provided between a device (e.g., a client device or access terminal) and a network entity. A removable storage device may be coupled to the device and stores a subscriber-specific key that may be used for subscriber authentication. A secure storage device may be coupled to the device and stores a device-specific key used for device authentication. Subscriber authentication may be performed between the device and a network entity. Device authentication may also be performed of the device with the network entity. A security key may then be generated that binds the subscriber authentication and the device authentication. That is, a key, data, and/or information from the subscriber authentication process and a key, data, and/or information from the device authentication process may be combined to generate the (composite) security key. The security key may be used to secure communications between the device and a serving network.

Exemplary Network Environment

Figure 1:
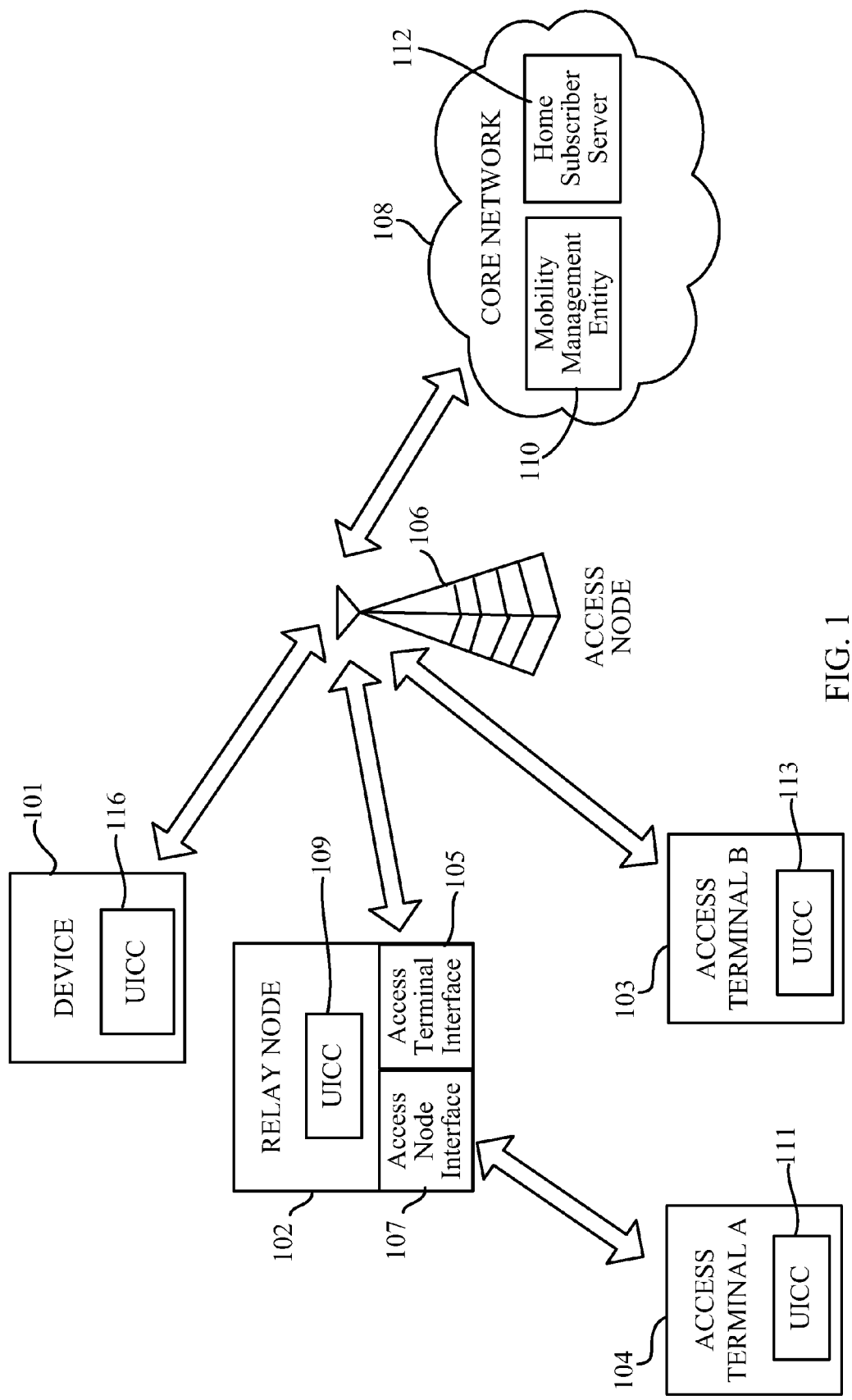
FIG. 1 is a block diagram illustrating a wireless communication system in which various types of wireless devices may be authenticated by a core network to obtain service.

FIG. 1 is a block diagram illustrating a wireless communication system in which various types of wireless devices may be authenticated by a core network to obtain service. This wireless communication system may be, for example, a Universal Mobile Telecommunications System (UMTS) compliant network or a compatible network or a Global System for Mobile communication (GSM)-compatible network or a Global System for Mobile communication (GSM)-compatible network. While some of the examples described herein may pertain to a Long Term Evolution (LTE) network, the various features described herein may be implemented in other networks as well.

The system may include one or more devices 101, such as access terminals 103/104 and relay node 102, that communicate with an access node 106. The relay node 102 may facilitate wireless transmissions between a wireless communication network 106/108 and one or more access terminals 104. The wireless communications system (e.g., a Long Term Evolution (LTE) network, LTE-Advanced network, etc.) may comprise a core network 108 and one or more access nodes 106. The access node 106 can be coupled to the core network 108 via a backhaul link (e.g., a wired connection). The core network 108 may include, for example, a mobile management entities (MME) 110, a home subscriber server (HSS) 112 and/or other components.

In one example, a mobile management entity (MME) 110 may be involved in bearer activation/deactivation for the device 101, relay node 102, and/or access terminals 103/104 (hereinafter generically called "device") and assisting with authentication by interacting with the Home Subscriber Server (HSS) 112. The MME 110 may also generate and/or allocate temporary identities to the devices (e.g., device 101, relay node 102, access terminals 103/104, etc.). It may check the authorization of the device to camp on (e.g., obtain service from, connect to, setup a communication link with) a service provider's Public Land Mobile Network (PLMN) and may enforce the device's roaming restrictions. The MME 110 may be the termination point in the network for ciphering/integrity protection for Non Access Stratum (NAS) signaling and handles security key management. The MME 110 may also perform track and/or paging procedures (including retransmissions) for the devices coupled to the core network 108.

The Home Subscriber Server (HSS) 112, is a master subscriber database that supports the network entities that actually handle devices. It may contain the subscription-related information (subscriber profiles), help perform authentication and authorization of the subscription, and can provide information about the subscriber's location. It is similar to the GSM Home Location Register (HLR) and Authentication Centre (AuC). The Home Location Register (HLR) may be a database that contains details of each subscriber that is authorized to use the core network. The HLR may assist the AuC in authenticating the subscribers (i.e., using the user terminals).

The relay node 102 may be adapted to amplify and/or repeat a signal between the access terminal 104 and the access node 106. In general, the relay node 102 can appear to the access terminal 104 as an access node (AN) and can appear to the access node 106 as an access terminal (AT). For instance, the relay node 102 may include an access terminal interface 105 with which it communicates with the access node 106 and may also include an access node interface 107 with which it communicates with the access terminal 104. That is, the access terminal interface 105 may make the relay node appear as an access terminal to the access node 106. Similarly, the access node interface 107 may make the relay node 102 appear as an access node to the access terminal 104. In some implementations, the relay node 102 may translate signals from a first format to a second format between the access terminal interface 105 and the access node interface 107. The relay node 102 might be placed near the edges of a cell so that the access terminal 104 can communicate with the relay node 102 rather than communicating directly with the access node 106.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the access terminal 104 can access the relay node 102 at a higher data rate or a lower transmission power than the access terminal 104 might use when communicating directly with the access node 106 for that cell. Transmission at a higher data rate creates higher spectrum efficiency, and lower power benefits the access terminal 104 by consuming less battery power, for example.

In some examples, the relay node 102 may be implemented as one of three relay types: a layer one relay node, a layer two relay node, and/or a layer three relay node. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node 102 is distinguished from an access node 106 by the fact that the relay node 102 may rely on the presence of at least one access node 106 (and the cell associated with that access node) or other relay node to access other components in a telecommunications system (e.g., the network 108). That is, the relay node 102 may appear as a subscriber device, client device, or access terminal to the network, therefore it connects to an access node to communicate over the network 108. However, to other subscriber devices, user devices, and/or access terminals 104, the relay node 102 may appear as a network device (e.g., an access node). Consequently, the relay node 102 may implement one or more communication interfaces to communicate with an access node and/or one or more access/subscriber/user terminals. In one example, the same transmitter/receiver (e.g., in one or more wireless channels) may be used by the relay node 102 to communicate with its access node and/or one or more access terminals. In another example, the relay node 102 may utilize two or more different transmitters/receivers to communicate with the access node and/or the one or more access terminals.

To mitigate misuse of a subscription to access network services, the devices may bind device authentication with subscriber authentication. Device authentication may work in conjunction with, for example, a standard 3GPP AKA (authentication and key agreement) access authentication based on credentials (such as a subscriber root key K) that are stored in a Universal Integrated Circuit Card (UICC) 109, 111, 113, and 116 or universal subscriber identification module (e.g., USIM) removably coupled to the device. In some embodiments, device authentication may be carried out in the same Non-Access Stratum (NAS) messages that are used for AKA authentication. In this manner, the device (e.g., the relay node 102, access terminals 103/104, etc.) may be bound to its subscription (i.e., service subscription with the core network 108) so as to prevent others from using its subscriber credentials (i.e., for a subscription service) in an unauthorized device.

One solution to the risk of unauthorized use of subscriber credentials is for the device (e.g., device 101, relay node 102 or access terminals 103/104) and UICC 109 to mutually authenticate each other (e.g., using secure channel between the host device and UICC), but that may require pre-provisioning a UICC 109, 111, 113, and 116 and/or the host device (e.g., device 101, relay node 102 or access terminals 103/104) with information to perform such mutual authentication.

Another solution may be to require that the keys used for network access (e.g., keys used to protect the traffic between the device and the network) depend on both credentials stored on the UICC 109, 111, 113, and 116 as well as the credentials stored on the device (e.g., device 101 relay node 102 or access terminals 103/104). This may be accomplished by binding the AKA authentication keys with the device authentication in some way. This solution is also useful in the case of International Mobile Equipment Identity (IMEI) authentication (which for example may allow an operator to stop unauthorized devices from attaching to their network). This is because, by binding the key(s) resulting from the AKA authentication used for network access with the keys used for the device authentication, it is assured that all the messages originating from the device to the network 108 indeed originate from the device that was authenticated. Under the assumption that the bound keys (and all other subsequent keys derived from the bound key) are stored securely on the device (e.g., device 101, relay node 102, or access terminals 103/104), binding of the keys from AKA authentication with device authentication provides a stronger security than using challenge/response based mechanism alone for the device authentication. Using a challenge/response mechanism alone for device authentication only proves that the device was present to generate the authentication response, but not that it remains present at a subsequent time.

Figure 2:
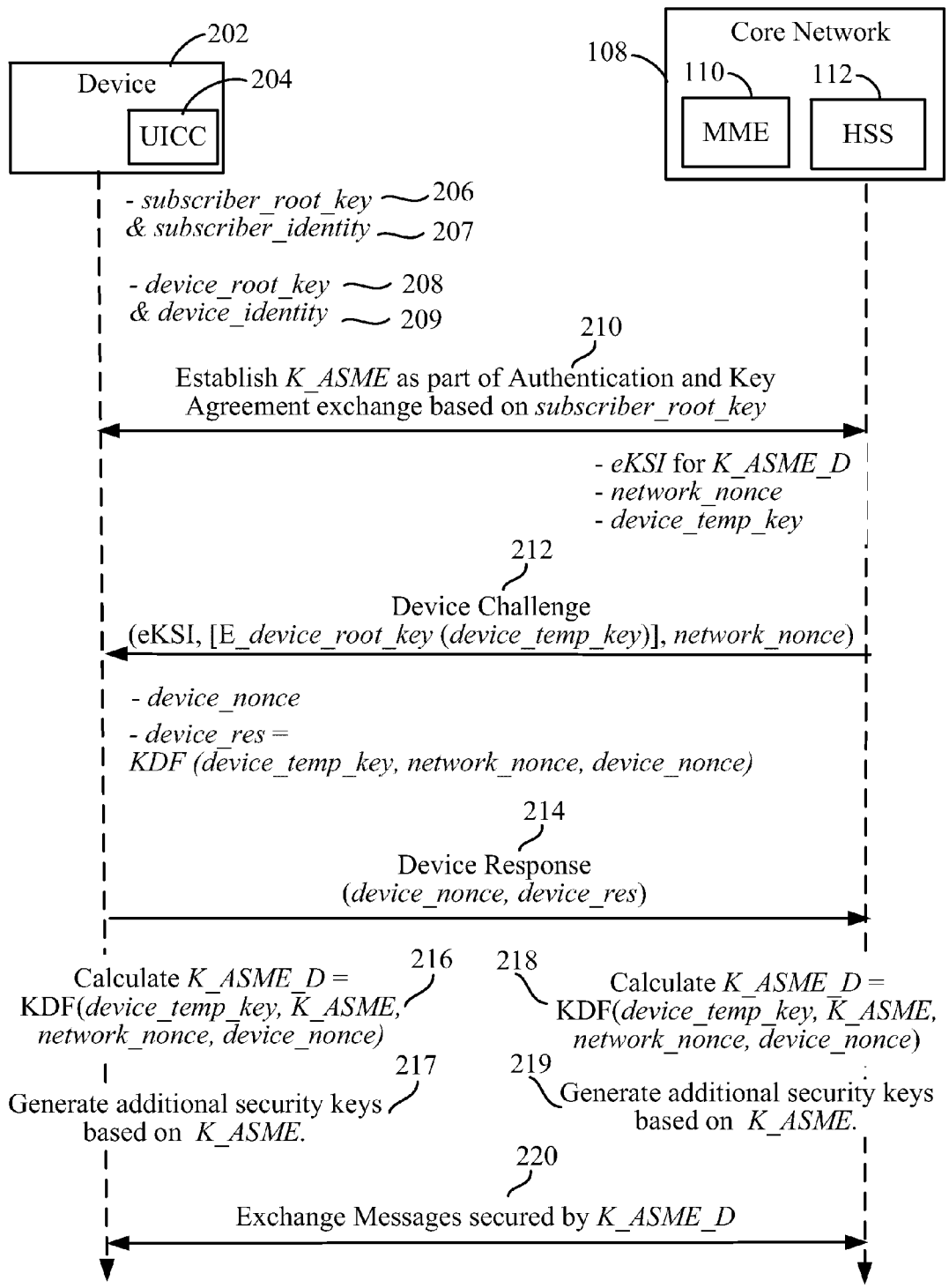
FIG. 2 illustrates a general approach to binding a device authentication and subscriber authentication.

FIG. 2 illustrates a general approach to binding a device authentication and subscriber authentication. The device 202 (e.g., device 101, relay node 102 or access terminals 103/104) may be provisioned with a subscriber_root_key 206 and/or a subscriber_identity 207 that can be used to authenticate a subscription with the core network 108 and/or generate security keys used to access encrypted traffic sent to the device 202. The subscriber_root_key 206 may be uniquely associated with the subscriber_identity 207. In one example, the subscriber_root_key 206 and/or a subscriber_identity 207 may be stored in the UICC 204 and/or subscriber authentication may be processed by the UICC 204. Similarly, device 202 may be provisioned with (or stores) a device_root_key 208 and/or a device_identity 209 that can be used to authenticate the device with the core network 108. The device_root_key 208 may be uniquely associated with the device_identity 209.

In one example, the device_identity 209 may be an International Mobile Equipment Identity (IMEI) of the device 202 (e.g., device 101, relay node 102 or access terminals 103/104, but other forms of identity associated with the device (e.g., IEEE Hardware address such as EUI-48 or EUI-64) may also be used.

In some implementations, the device_root_key 208 may be a secret key shared by the device 202 only with the core network 108 but not transmitted over the air. The device_identity 209 may be transmitted by the device 202 to the core network 108 so that it can obtain the correct device_root_key to be used in device authentication. Alternatively, the device_root_key 208 may be a public key of a public/private key pair, where certificates are used for device authentication. For example, device may receive some data from the network, where the data is encrypted with the public key. The device may then use its private key to decrypt the encrypted data and subsequently prove to the network that it has knowledge of the data. The certificate (e.g., device_credentials) may be verified by the core network 108. The associated private key of the device 202 may be stored securely in the device 202. The device_credentials may refer to either the device certificate or a pointer to it. These device_credentials may allow the relevant network entity to form the device_challenge and to check the revocation status of the device 202 (e.g., check whether the credentials such as the private key or the shared key associated with the device is compromised). It is further assumed that a secure part of the device (such as a Trusted Environment or TrE as defined in 3GPP Technical Specification 33.320) stores the sensitive device keys, such as the device_root_key and/or the private key associated with the certificate. Furthermore, it is assumed that the TrE performs all cryptographic operations that make use of these keys.

Initially, subscriber authentication may take place between the device 202 and the network 108. For instance, an authentication and key agreement (AKA) exchange 210 between the device 202 and network 108 may result in establishing a key K_ASME. Such AKA exchange 210 may be based, for example, on the subscriber_root key 206 and/or the subscriber_identity 207 to authenticate a subscriber associated with the device 202. For instance, such subscription information or credentials may be securely stored in the UICC 204 which is removably coupled to the host device 202.

The network 108 may also perform device authentication on the device 202. The device_identity 209 may be provided to the core network 108 by the device 202 so that the core network 108 can look-up or obtain the correct corresponding device_root_key 208. The network 108 may create a device_challenge 212 and sends it to the device 202 (e.g., as part of a relevant NAS message). In response, the device 202 computes the device_response 214 (e.g., based on the device_challenge and device_root_key 208 or derivative thereof) and returns it to the network 108. The device 202 may use the data in device_challenge and device_response to calculate a composite security key K_ASME_D 216. Note that, in the case of the device 202, the composite security key K_ASME_D 216 may be generated either before or after the device_response 214 is sent. In one example, the composite security key K_ASME_D may be the equivalent key to security key K_ASME defined in Evolved Universal Terrestrial Radio Access Network E-UTRAN (E-UTRAN) defined in 3GPP Technical Specification 33.401, except that the key K_ASME_D is bound to the device_identity 209 as well to a key resulting from AKA authentication, such as the K_ASME key. If the network 108 receives a valid device_response, the network 108 also calculates the composite security key K_ASME_D 218.

The calculation of device_challenge 212, device_response 214 and the composite security key K_ASME_D may be as follows. The device_challenge 212 may be calculated as:

$$\text{device\_challenge} = \text{eKSI}, [E\_\text{device\_root\_key}(\text{device\_temp\_key})], \text{network\_nonce},$$

where eKSI is an evolved/extended key set identifier that will be associated with K_ASME_D, [ . . . ] denotes an optional parameter, E_k (data) means data encrypted with key k, and network_nonce is a suitable size random number (e.g., 128-bits) chosen by the network. The encryption algorithm can be either asymmetric (in the case the device_root_key is a public key associated with a device certificate) or symmetric (in the case the device_root_key is a shared key). The device_temp_key may be a key that is obtained or generated as part of device authentication. In one example, the device_temp_key may be chosen (e.g., randomly) by the network 108, is sent to the device 202 in an encrypted form, and is of appropriate length (e.g., 256 or 128-bit value).

Both the device 202 and the network 108 may keep the device_temp_key between network accesses for optimization purposes. If this is not the case, the second parameter ([E_device_root_key (device_temp_key)]) in the device challenge 212 is not optional.

The device_response 214 may be calculated as:

device_response=device_nonce,device_res, where device_nonce is a suitable size random number (e.g., 128-bits) chosen by the device and device_res=KDF(device_temp_key,network_nonce, device_nonce)

where KDF is a cryptographic function suitable for generating the response device_res.

Having previously obtained an authentication key K_ASME (e.g., as part of AKA exchange 210), the calculation of a composite security key K_ASME_D 216 and 218 (i.e., binding device authentication and subscriber authentication), may be done as follows:

K_ASME_D=KDF(device_temp_key,K_ASME,network_nonce,device_nonce)

where K_ASME may be a key or value obtained during subscriber authentication between the device and the network (as a result of the AKA authentication exchange 210). In one example, the K_ASME key may be a key that is previously generated and/or used between device 202 and the network 108. Alternatively, if the device authentication process 212 and 214 is being performed using the same NAS messages as the NAS messages used for the AKA procedure 210, the K_ASME key may be newly or concurrently generated. Similarly, device_temp_key may be a key or value obtained during device authentication between the device 202 and the network 108.

The composite security key may then be used as the basis and/or root for calculating additional security keys 217 and 219. The additional security keys may serve to secure, for example, NAS-level and/or AS-level communications.

The composite security key K_ASME_D, associated security parameters, and all the keys derived from K_ASME_D may be held securely on the device 202 and are not stored on the UICC 204. The composite security key K_ASME_D may then be used to secure messages exchanged 220 between the device 202 and the core network 108.

Figure 3A:
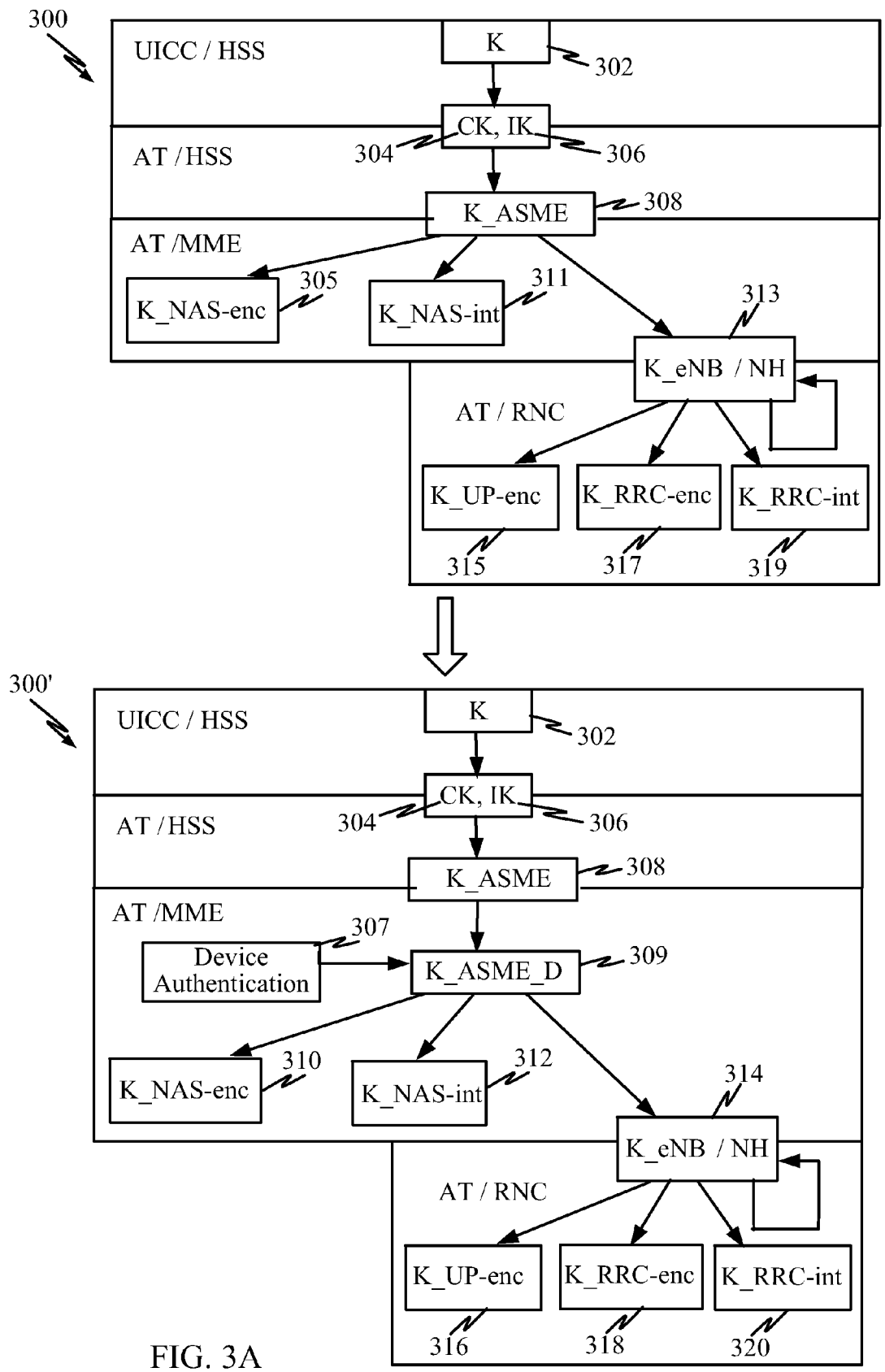
FIG. 3 (comprising FIG. 3A and FIG. 3B) illustrates an example of how a key hierarchy based on subscriber authentication may be modified to add device authentication.
Figure 3B:
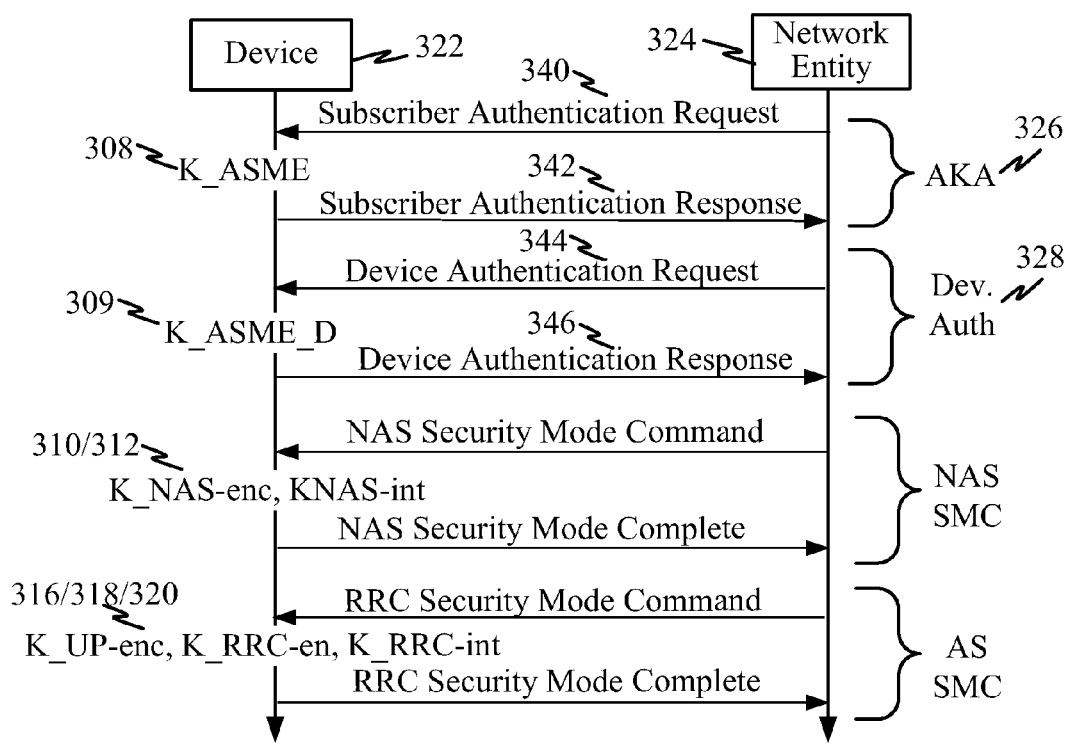

FIG. 3 (comprising FIG. 3A and FIG. 3B) illustrates an example of how a key hierarchy based on subscriber authentication may be modified to also include device authentication. A key hierarchy may be implemented to establish the security parameters (e.g., a security key) for use in encrypting/decrypting communications between a device and a network. In this example, subscriber and device authentication may be performed between a device 322 and a network entity 324. The device 322 may be an access terminal (AT), a user equipment (UE), a mobile phone, and/or a relay node, for example. The network entity 324 may be one or more network devices, such as a mobility management entity (MME) and/or home subscriber server (HSS).

This example illustrates how a first key hierarchy 300 based on subscriber authentication is modified to obtain a second key hierarchy 300' based on both subscriber authentication and device authentication.

For purposes of subscriber authentication as illustrated in the first key hierarchy 300, a Universal Integrated Circuit Card (UICC in the device 322), and the network entity 324 (e.g., MME 110, HSS 112 in FIG. 1, or other network entity) may use a master key K 302 to generate a cipher key (CK) 304 and integrity key (IK) 306. The cipher key (CK) 304 and integrity key (IK) 306 may then be used by the device 322 and the network entity 324 as part of an authentication and key agreement (AKA) exchange to generate an Access Security Management Entity key K_ASME 308 (also referred herein as a subscriber authentication key). The security activation of the device 202 may be accomplished through an Authentication and Key Agreement procedure (AKA), a Non-Access Stratum (NAS) Security Mode Configuration (NAS SMC) procedure and an Access Stratum (AS) Security mode Configuration (AS SMC) procedure.

In this example, subscriber authentication may include the AKA exchange 326 that results in the K_ASME 308. The AKA exchange 326 may include a subscriber authentication request 340 and a subscriber authentication response 342. In this example, the subscriber authentication process that generates the K_ASME key 308 may also generate associated NAS-level keys (e.g., K_NAS-enc 305 and K_NAS-int 311) and/or AS-level keys (e.g., K_UP-enc 315, K_RRC-enc 317, and K_RRC-int 319). Note that, in some implementations, if these versions of the NAS-level keys and AS-level keys are not used, then the generation of these keys may be foregone during subscriber authentication.

The second key hierarchy 300' illustrates how device authentication may be bound to subscriber authentication to generate NAS-level and AS-level security keys. Concurrently, prior, or subsequent to subscriber authentication (and generating its corresponding K_ASME key 308), device authentication 328 may be performed based, at least partially, on a device-specific root key. Device authentication 328 may include a device authentication request 344 and a device authentication response 346. In one implementation, device authentication 307 may be independent of subscriber authentication; only if both subscriber and device authentication are satisfied is a composite security key K_ASME_D 309 generated. In an alternative implementation, device authentication may be performed prior to subscriber authentication.

The composite security key K_ASME_D 309 may be used as a base key for the calculation of, for example, NAS (Non-Access Stratum) keys 310 and 312 and AS (Access Stratum) keys 314, 316, 318, and 320. That is, the device 322 and the network entity 324 may then use the K_ASME_D key 309 to generate one or more security keys.

Figure 4:
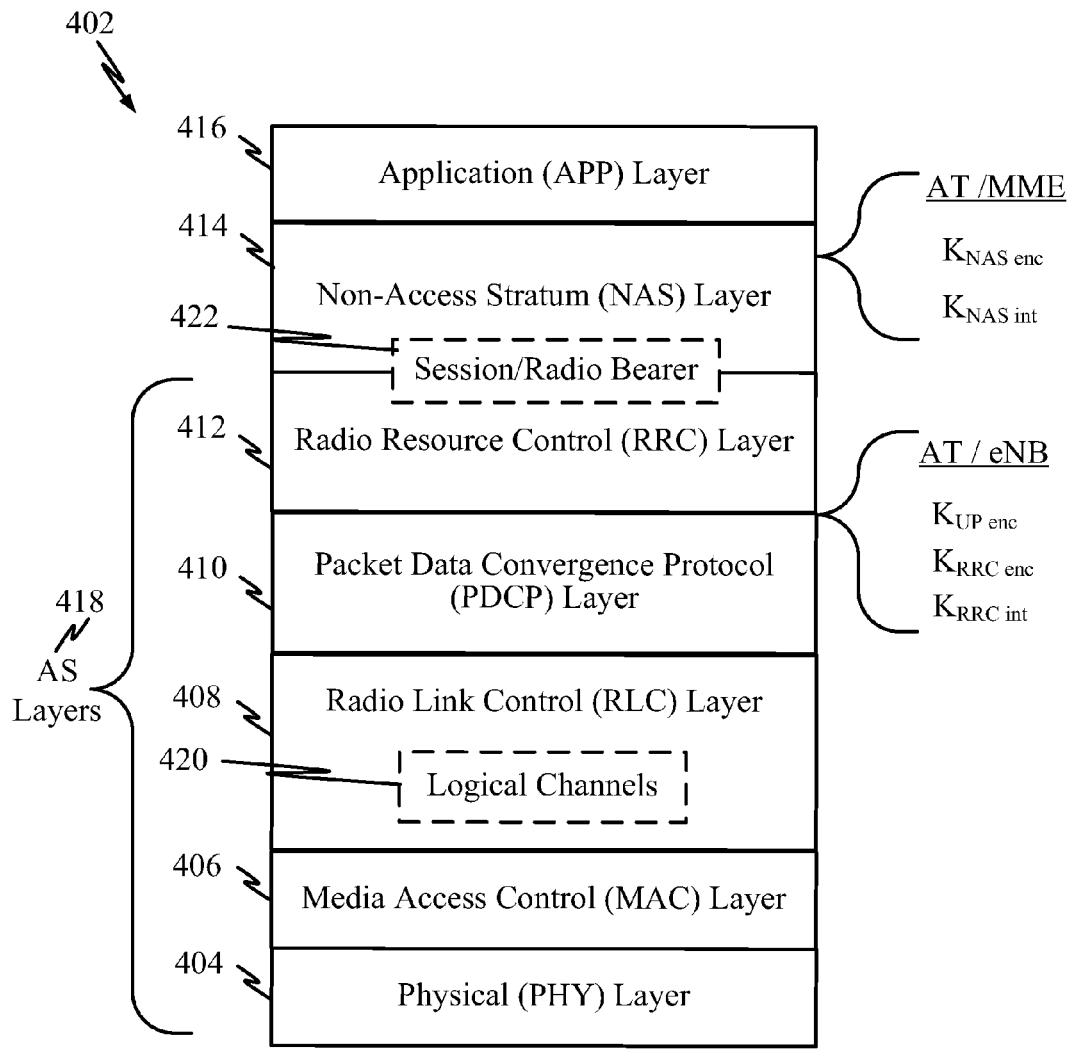
FIG. 4 illustrates an exemplary protocol stack that may be implemented in a device operating in a packet-switched network.

Packet-switched networks may be structured in multiple hierarchical protocol layers, where the lower protocol layers provide services to the upper layers and each layer is responsible for different tasks. For example, FIG. 4 illustrates an exemplary protocol stack that may be implemented in a device operating in a packet-switched network. In this example, the protocol stack 402 includes a Physical (PHY) Layer 404, a Media Access Control (MAC) Layer 406, a Radio Link Control (RLC) Layer 408, a Packet Data Convergence Protocol (PDCP) Layer 410, a Radio Resource Control (RRC) Layer 412, a Non-Access Stratum (NAS) Layer 414, and an Application (APP) Layer 416.

The layers below the NAS Layer 414 are often referred to as the Access Stratum (AS) Layer 418. The RLC Layer 408 may include one or more channels 420. The RRC Layer 412 may implement various monitoring modes for the access terminal, including connected state and idle state. The Non-Access Stratum (NAS) Layer 414 may maintain the communication device's mobility management context, packet data context and/or its IP addresses. Note that other layers may be present in the protocol stack 402 (e.g., above, below, and/or in between the illustrated layers), but have been omitted for the purpose of illustration.

Referring to FIG. 4, radio/session bearers 422 may be established, for example at the RRC Layer 412 and/or NAS Layer 414. Consequently, the NAS Layer 414 may be used by the device 202 and the core network 108 to generate the security keys K_NAS-enc 310 and K_NAS-int 312 shown in FIG. 3. Similarly, the RRC Layer 412 may be used by the device 202 and the access node 108 to generate the Access Stratum (AS) security keys K_UP-enc 316, K_RRC-enc 318, and K_RRC-int 320. While the security keys K_UP-enc 316, K_RRC-enc 318, and K_RRC-int 320 may be generated at the RRC Layer 312, these keys may be used by the PDCP Layer 410 to secure signalling and/or user/data communications. For instance, the key K_UP-enc 316 may be used by the PDCP Layer 410 to secure for user/data plane (UP) communications, while the keys K_RRC-enc 318, and K_RRC-int 320 may be used to secure signalling (i.e., control) communications at the PDCP Layer 410.

In the derivation of these security keys, used for ciphering and integrity algorithms, both at the AS (User plane and RRC) and NAS requires that an individual algorithm identity be provided as one of the inputs. At the AS level, the algorithms to be used are provided by a Radio Resource Control (RRC) Security Mode Command.

Figure 5:
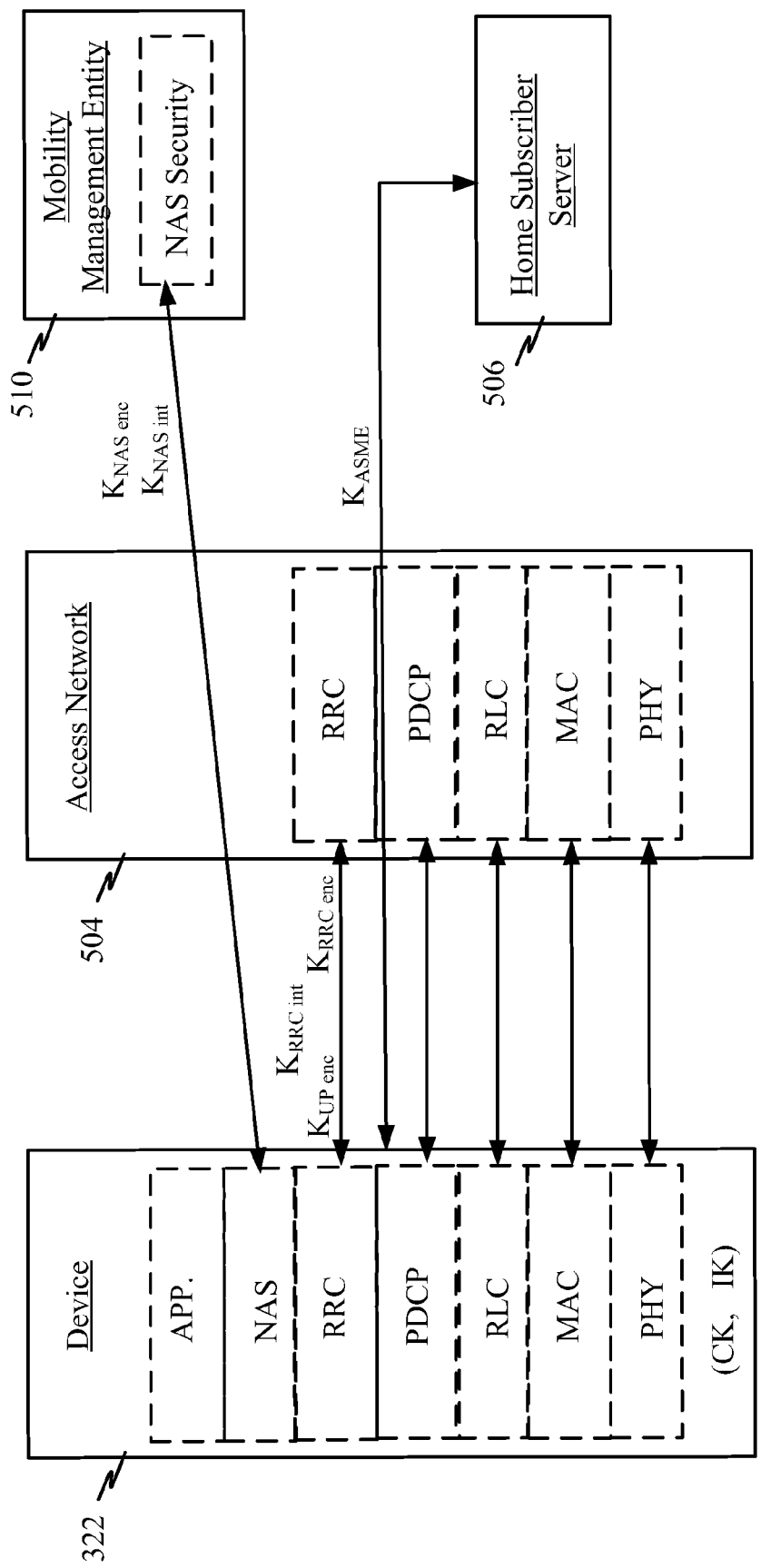
FIG. 5 is a block diagram illustrating a network system in which the various authentication and/or security keys illustrated in FIGS. 3 and 4 may be generated.

FIG. 5 is a block diagram illustrating a network system in which the various authentication and/or security keys illustrated in FIGS. 3 and 4 may be generated. Here, the device 322 may implement a communication stack that includes various layers (e.g., APP, NAS, RRC, RLC, MAC, and PHY). An access network 504 (e.g., access node 106 in FIG. 1) may provide wireless connectivity to the device 322 so that it may communicate with the network 108. The home subscriber server 506 and device 322 may both know or have access to a root key (K) which can be used to generate or obtain a cipher key (CK) and/or an integrity key (IK). The device 322 and/or HSS 506 may then use the cipher key (CK) and/or integrity key (IK) to generate an Access Security Management Entity key K_ASME. Device authentication may also be performed and combined with or based on the K_ASME key to generate a composite security key K_ASME_D, thereby combining subscriber and device authentication into one key. Using the K_ASME_d key, the device 322 and a mobility management entity (MME) 510 may then generate the keys K_NAS-enc and K_NAS-int. The device 322 and MME 510 may also generate an access network-specific key K_eNB/NH. Using this access network-specific key K_eNB/NH, the device 322 and access network 504 may generate the keys K_UP-enc and K_RRC-enc and K_RRC-int.

Details about the derivation of these keys is provided in the 3GPP STD-T63-33.401 "System Architecture Evolution (SAE): Security Architecture" (known as 3GPP TS 33.401) Release 8, which is incorporated herein by reference. Note that while FIGS. 3-5 describe a particular environment/context in which device and subscriber authentication and binding may be implemented, this is not intended to be limiting of this feature which may be implemented in various other types of networks.

Exemplary Wireless Device

Figure 6:
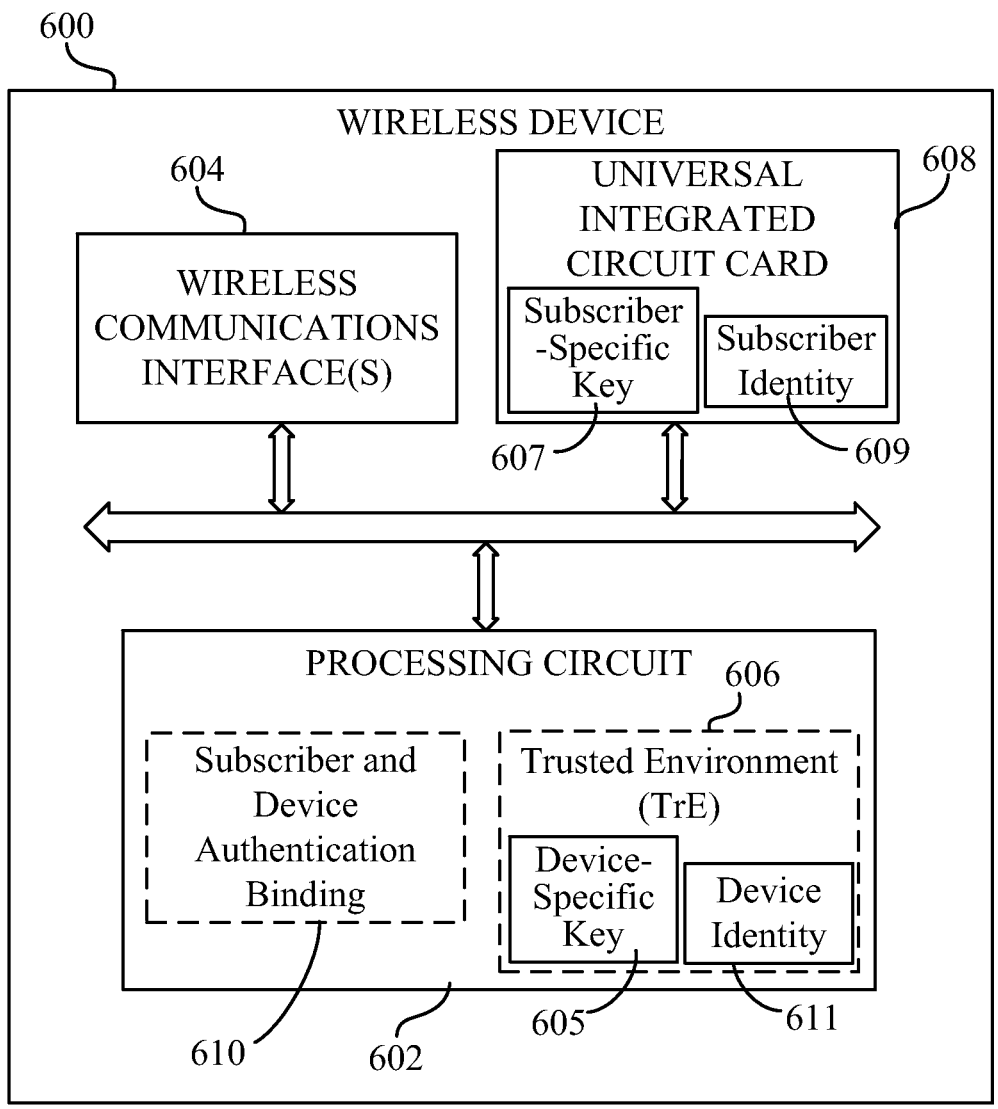
FIG. 6 is a block diagram illustrating select components of a wireless device that may be adapted to bind subscriber authentication and device authentication.

FIG. 6 is a block diagram illustrating select components of a wireless device 600 that may be adapted to bind subscriber authentication and device authentication. The wireless device 600 generally includes a processing circuit 602 coupled to one or more wireless communication interface(s) 604. For instance, the wireless device 600 may be a relay node and/or an access terminal.

The processing circuit 602 may be arranged to obtain, process and/or send data, control data access and storage, issue commands, and control other desired operations. The processing circuit 602 may comprise circuitry configured to implement desired programming provided by appropriate media in at least one embodiment. For example, the processing circuit 602 may be implemented as one or more of a processor, a controller, a plurality of processors and/or other structure configured to execute executable instructions including, for example, software and/or firmware instructions, and/or hardware circuitry. Embodiments of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 602 are for illustration and other suitable configurations within the scope of the present disclosure are also contemplated.

The wireless communications interface 604 may be configured to facilitate wireless communications of the wireless device 600. For example, the communications interface 604 may be configured to communicate information bi-directionally with respect to other wireless devices, such as access terminals, access nodes, other relay nodes, etc. The communications interface 604 may be coupled to an antenna (not shown) and may include wireless transceiver circuitry, including at least one transmitter and/or at least one receiver (e.g., one or more transmitter/receiver chains) for wireless communications.

The processing circuit 602 may include a subscriber and device authentication binding module 610. The subscriber and device authentication module 610 can comprise circuitry and/or programming adapted to perform subscriber authentication procedures using subscriber security credentials (e.g., a subscriber-specific key 607 and/or a subscriber identity 609 stored in a Universal Integrated Circuit Card 608), adapted to perform (within a trusted environment 606) device authentication procedures using a device-specific credentials (e.g., a device-specific key 605 and/or a device identity 611), and bind the subscriber and device authentications together. Such "binding" may involve combining some results from both subscriber authentication and device authentication. For example, a first security key obtained from subscriber authentication may be combined with a second security key obtained from device authentication to obtain a third (composite) security key.

In some embodiments, the wireless device 600 may include a trusted environment (TrE) 606. The trusted environment 606 may be adapted to meet the specifications for a trusted environment in the 3GPP Specification Detail at TS 33.320. The trusted environment 606 may be pre-provisioned (or securely embedded) with at least some security credentials (e.g., device-specific key 605 and/or device identity 611). For example, the trusted environment 606 may have security credentials related to device authentication.

In some embodiments, the wireless device 600 may include secured processing within the universal integrated circuit card (UICC) 608. The UICC 608 may be removably coupled to the wireless device 600. The UICC 608 may be pre-provisioned with subscriber security credentials (e.g., subscriber-specific key 607 and/or subscriber identity 609), such as initial authentication and key agreement (AKA) credentials. Alternatively, secured processing may be performed within a universal subscriber identity module (USIM).

According to one or more features of the wireless device 600, the processing circuit 602 may be adapted to perform any or all of the processes, functions, steps and/or routines related illustrated in FIGS. 2-5, 7, 10, 11, and 12. As used herein, the term "adapted" in relation to the processing circuit 602 may refer to the processing circuit 602 being configured, employed, implemented, and/or programmed to perform a particular process, function, step and/or routine according to various features described herein.

Figure 7:
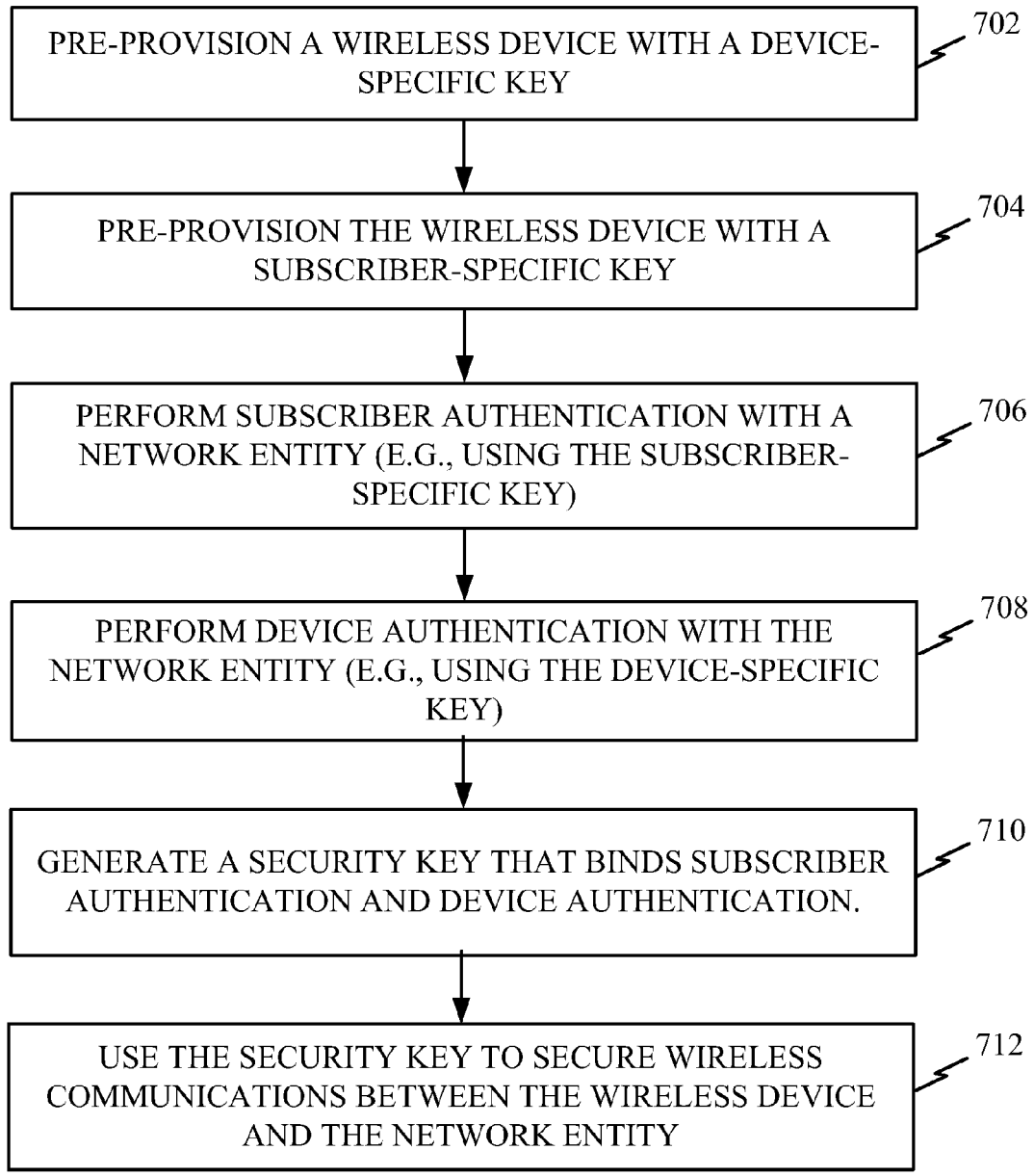
FIG. 7 is a flow diagram illustrating an example of a method operational in a wireless device to generate a security key that binds subscriber authentication and device authentication.

FIG. 7 is a flow diagram illustrating an example of a method operational in a wireless device to generate a security key that binds subscriber authentication and device authentication. The wireless device may be pre-provisioned with a device-specific key 702. For instance, such device-specific key may be embedded in a chip or configured during manufacturing of the wireless device. The wireless device may also include a device identifier associated with the device-specific key. Additionally, the wireless device may be pre-provisioned with a subscriber-specific key 704. For instance, such subscriber-specific key may be a root key assigned to a subscriber and may be stored within a fixed or removable module (e.g., UICC or USIM) coupled to the wireless device. The wireless device may also include a subscription identity associated with the subscriber-specific key. The wireless device may perform subscriber authentication with a network entity (e.g., using the subscriber-specific key) 706. This may include, for example, an authentication and key agreement exchange with the network entity. The wireless device may also perform device authentication with the network entity (e.g., using the device-specific key) 708. Subscriber authentication and device authentication may be performed at the same or different times and with the same network entity or with different network entities. A security key (e.g., K_ASME_D, etc.) may then be generated by the wireless device, such security key binding subscriber authentication and device authentication 710. For instance, in one example, data (e.g., one or more resulting keys, certificates, identifiers, etc.) from device authentication and data (e.g., one or more resulting keys, certificates, identifiers, etc.) from subscriber authentication may be combined to generate the security key. For instance, in FIG. 1, the K_ASME key from subscriber authentication 210 and the device_temp_key from device authentication in FIG. 1 may be combined to generate the security key K_ASME_D. The security key may then be used to secure wireless communications between the wireless device and the network entity 712. For instance, the security key may be used to generate other keys and/or certificates (e.g., NAS-level and/or AS-level security keys) which may serve to encrypt/decrypt communications (e.g., data and signaling) between the wireless device and the network.

Exemplary Network Entity

Figure 8:
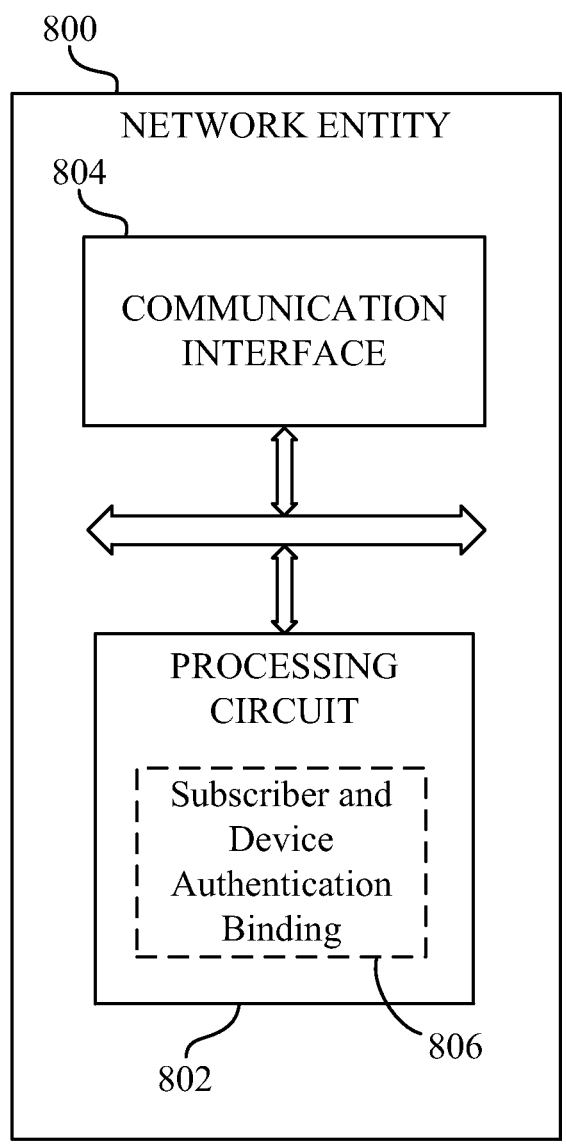
FIG. 8 is a block diagram illustrating select components of a network entity that may be adapted to bind subscriber authentication and device authentication.

FIG. 8 is a block diagram illustrating select components of a network entity 800 that may be adapted to bind subscriber authentication and device authentication. The network entity 800 may include a processing circuit 802 coupled to a communications interface 804. The processing circuit 802 is arranged to obtain, process and/or send data, control data access and storage, issue commands, and control other desired operations. The processing circuit 802 may comprise circuitry configured to implement desired programming provided by appropriate media in at least one embodiment. For example, the processing circuit 802 may be implemented as one or more of a processor, a controller, a plurality of processors and/or other structure configured to execute executable instructions including, for example, software and/or firmware instructions, and/or hardware circuitry. Embodiments of the processing circuit 802 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 802 are for illustration and other suitable configurations within the scope of the present disclosure are also contemplated.

The processing circuit 802 includes a subscriber and device authentication binding module 806. The subscriber and device authentication binding module 806 can comprise circuitry and/or programming adapted to perform subscriber authentication procedures for authenticating a subscription based on subscriber security credentials (e.g., subscriber-specific key and/or subscriber identifier), perform device authentication procedures for authenticating the device based on a device-specific credentials (e.g., device-specific key and/or device identifier), and bind data (e.g., keys, values, certificates, etc.) from the device authentication and subscriber authentication to generate a security key.

The communications interface 804 is configured to facilitate communications of the network entity 800 to communicate, either directly or indirectly (e.g., through one or more other network entities), with other devices, such as relay nodes and access terminals.

According to one or more features of the network entity 800, the processing circuit 802 may be adapted to perform any or all of the processes, functions, steps and/or routines related to the various network entities, such as a mobile management entity (MME) 110 and a home subscriber server (HSS) 112. Furthermore, the network entity 800 may comprise a single entity, or a combination of two or more entities of the network. By way of example and not limitation, the network entity 800 may comprise a mobile management entity (MME), a home subscriber server (HSS), a device authentication server, among others. As used herein, the term "adapted" in relation to the processing circuit 802 may refer to the processing circuit 802 being one or more of configured, employed, implemented, or programmed to perform a particular process, function, step and/or routine according to various features described herein.

Figure 9:
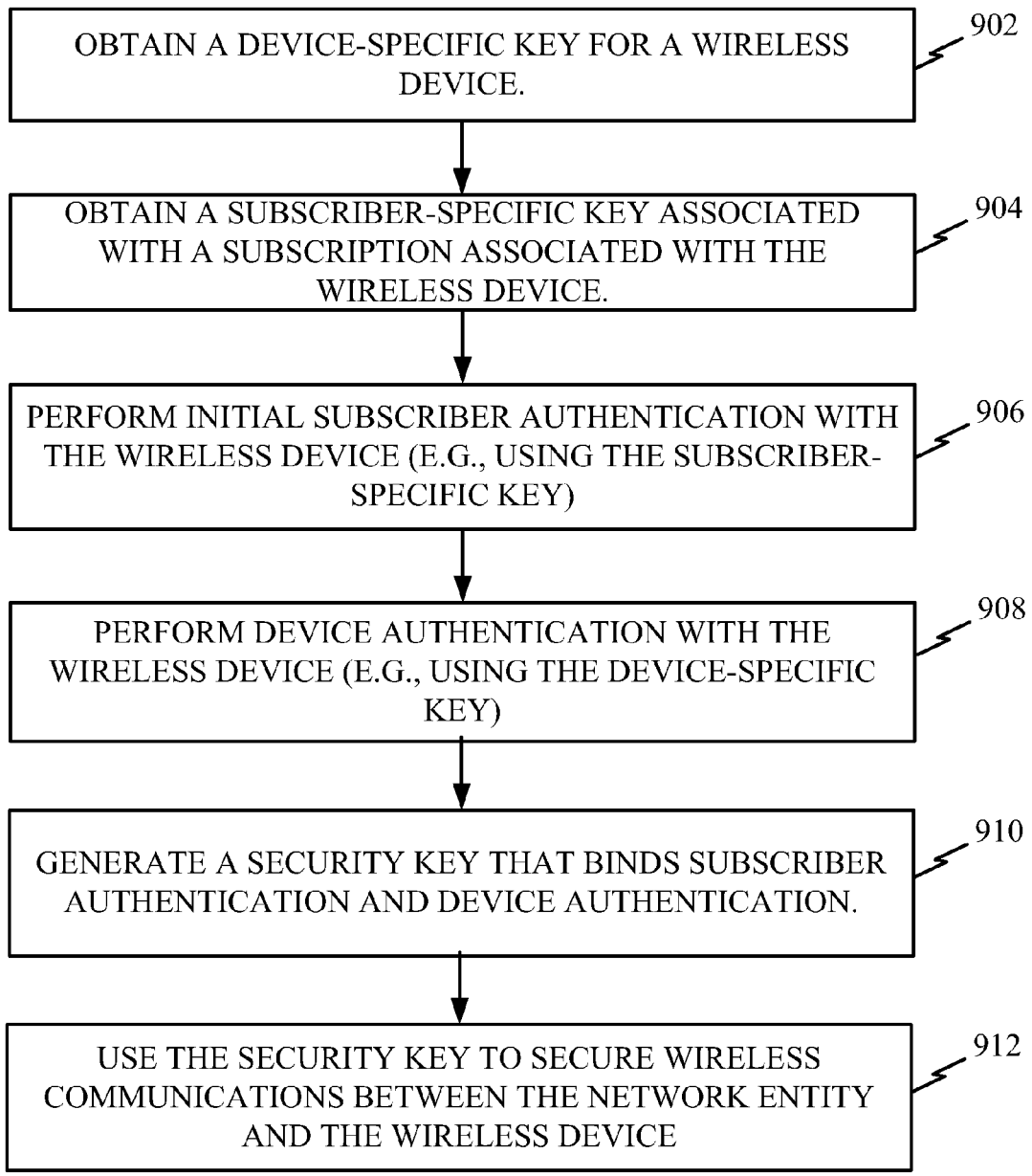
FIG. 9 is a flow diagram illustrating an example of a method operational in a network entity to generate a security key that binds subscriber authentication and device authentication.

FIG. 9 is a flow diagram illustrating an example of a method operational in a network entity to generate a security key that binds subscriber authentication and device authentication. The network entity may obtain a device-specific key for a wireless device 902. For instance, such device-specific key may be embedded in a chip or configured during manufacturing of the wireless device and this information may be stored in a database that the network entity can access. A device identifier may be associated with the device-specific key and may be used to identify the device and its key. Additionally, the network entity may obtain a subscriber-specific key associated with a subscription for the wireless device 904. For instance, such subscriber-specific key may be a root key assigned to a subscriber and may be stored within a fixed or removable module (e.g., UICC or USIM) coupled to the wireless device. The network entity may perform subscriber authentication with the wireless device (e.g., using the subscriber-specific key) 906. This may include, for example, an authentication and key agreement exchange with the network entity. The network entity may also perform device authentication with the wireless device (e.g., using the device-specific key) 908. Subscriber authentication and device authentication may be performed at the same or different times. A (composite) security key (e.g., K_ASME_D, etc.) may then be generated by the network entity, such security key binding subscriber authentication and device authentication 910. For instance, in one example, data (e.g., one or more resulting keys, certificates, identifiers, etc.) from device authentication and data (e.g., K_ASME, etc.) from subscriber authentication may be combined to generate the security key. The security key may then be used to secure wireless communications between the network entity and the wireless device 912. For instance, the security key may be used to generate other keys and/or certificates which may serve to encrypt/decrypt communications between the wireless device and the network.

First Exemplary Method of Subscriber-Device Authentication

Figure 10:
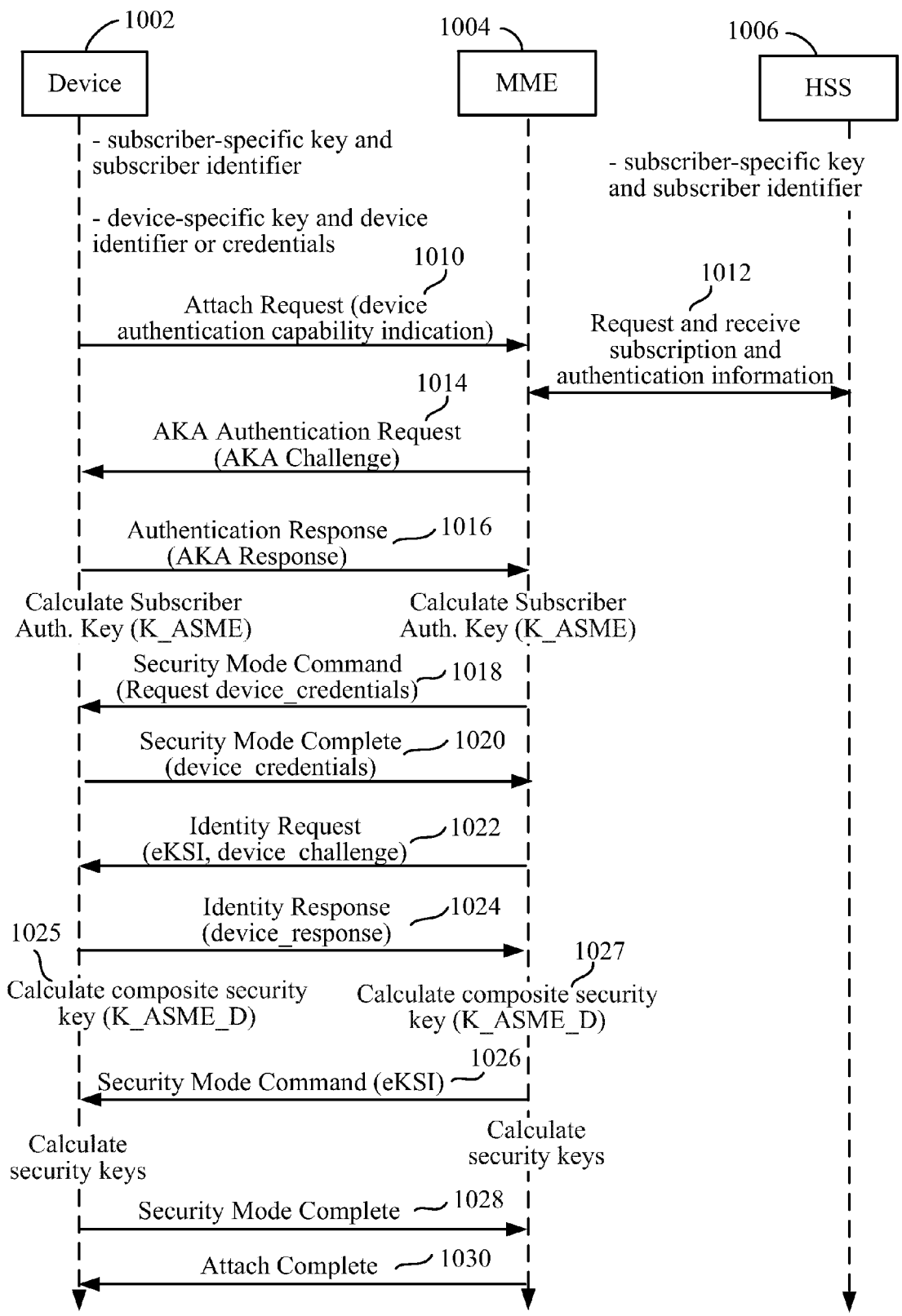
FIG. 10 illustrates a first exemplary method for generating a security key by binding subscriber and device authentication.

FIG. 10 illustrates a first exemplary method for generating a security key by binding subscriber and device authentication. In this example, the device 1002 may be a relay node or an access terminal, for example. During an attach stage, where the device 1102 may seek to attach to a wireless network (e.g., which includes MME 1002 and HSS 1006), revealing a device identity or other related device information over the air may be a security concern (e.g., for the device 1002). Consequently, in this method, the device 1002 does not present its device credentials (e.g., a device-specific identifier such as an International Mobile Equipment Identity (IMEI), etc.) over the air until securely requested by the network in order to prevent passive attacks on the device identity.

The device may start by sending to the network an Attach Request 1010 including an indication that it is capable of device authentication. Upon receipt of the Attach Request 1010, a mobility management entity (MME) 1004 may request and receive subscription and authentication information 1012 (e.g., associated with a subscription-based account or user of the device 1002) from a home subscription server (HSS) 1006. The MME 1004 then sends an Authentication Request 1014 which includes an AKA Challenge in order to perform AKA authentication. Upon receipt of the AKA Authentication Request 1014, the device 1002 sends an Authentication Response 1016 including an AKA response. The AKA Authentication Request 1014 and Response 1016 serve to perform subscription authentication. Such AKA authentication procedures may result in an subscriber authentication key (e.g., K_ASME) being generated by the device 1002 and the MME.

Device authentication may be performed at various stages during this security activation process. In this example, device authentication may be piggy-backed on the NAS-level security messages. For example, the MME 1004 may send a NAS Security Mode Command 1018 which includes a request for device identity (e.g., a request for IMEI Software Version (IMEISV) and/or request for device_credentials). In response, the device 1002 may provide a device identity or credential, within a Security Mode Complete 1020 message, that device authentication is to be performed. Note that, to avoid exposing the device identity or credential over the air during transmission, the device identity or credential in Security Mode Complete 1020 may be secured by the previously computed subscriber authentication key (e.g., K_ASME). Upon receipt of the device identity or credential, the MME 1004 may send an Identity Request 1022 message, with an evolved/extended key set identifier (eKSI) and a device_challenge. The eKSI may be associated with a K_ASME_D to be generated. Thus, the eKSI used in the Identity Request 1022 may be different or distinct from any other eKSI that may have been used, for example, for AKA (i.e., subscriber authentication). Upon receipt of the Identity Request 1022 message, the device 1002 may generate a device_response based on the device_challenge and sends this as part of an Identity_Response 1024 message. The device_response may be based on the device_challenge and the device identity or credential. The device 1002 may then calculate a (composite) security key (K_ASME_D) 1025 based on the authentication key (e.g., K_ASME) and device authentication data (e.g., device response, etc.). The MME 1004 checks the device_response, for example, by using the device identity or certificate of the device 1002 and using on the device_challenge. If the device 1002 is successfully authenticated by the MME 1004, the MME 1004 also generates the security key (K_ASME_D) 1027. At this point, the device 1002 and MME 1004 share the security key (K_ASME_D) and its associated identifier eKSI.

The MME 1004 may then send a Security Mode Command 1026 with the evolved/extended key set identifier eKSI associated with the security key (K_ASME_D). This allows the device 1002 to compute one or more security keys based on the security key (K_ASME_D). The device 1002 may send a Security Mode Complete 1028 message to the MME 1004, thereby allowing the MME 1004 to send an Attach Complete 1030 message.

Second Exemplary Method of Subscriber-Device Authentication

Figure 11:
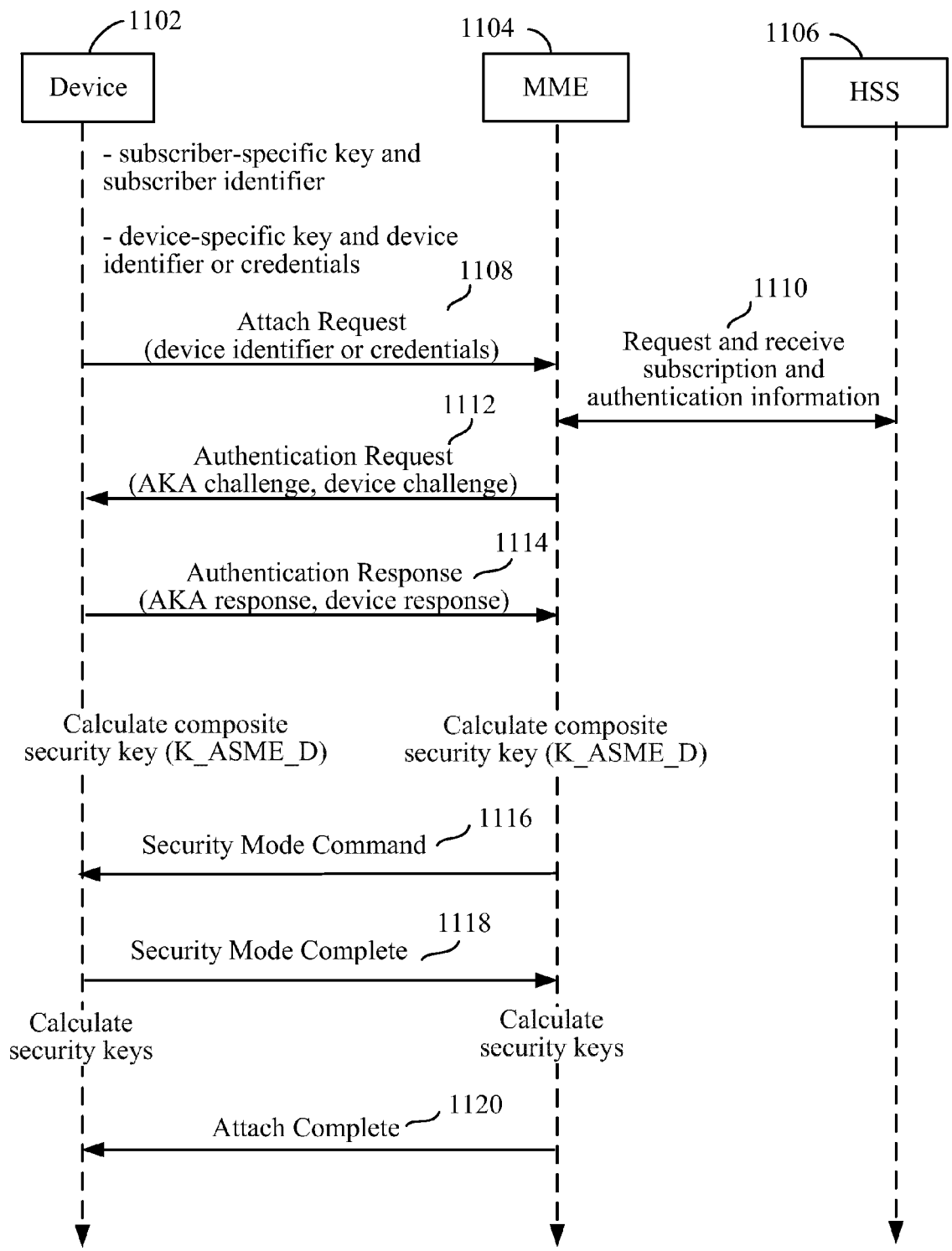
FIG. 11 illustrates a second exemplary method for generating a security key by binding subscriber and device authentication.

FIG. 11 illustrates a second exemplary method for generating a security key by binding subscriber and device authentication. In this example, revealing the device identity or certificate (or other related credential information) in an over the air transmission is not a security concern. Unlike the method of FIG. 10, in this case, it is assumed that presenting the device identity upfront will not lead to any privacy issues or risks.

The device already has a device identifier or credentials (e.g., IMEI) that the MME will accept but does not have an E-UTRAN security context that the MME is willing to use.

The device 1102 sends an Attach Request 1108 including its device identifier or credentials to the MME 1104. The MME 1104 may obtain a subscription and authentication information 1110 from HSS 1106 and sends an Authentication Request 1112 including, for example, an AKA challenge (for subscription authentication) and/or a device challenge (for device authentication). Note that the device 1102 may respond by sending an Authentication Response 1114 that may include an AKA response and/or a device response. The AKA response may be based, at least partially, on the subscriber identifier. The device response may be based on the device identifier and/or credentials and the device challenge The device 1104 may then generate a (composite) security key K_ASME_D by combining subscriber authentication information and device authentication information. Similarly, upon successful verification of the AKA response and device response, the MME 1104 may also generate the security key K_ASME_D by combining subscriber authentication information and device authentication information.

The MME sends a Security Mode Command 1116 message to start using the security context based on the security key K_ASME_D. The device 1102 responds with a Security Mode Complete 1118 message. That is, the device 1102 and MME 1104 may generate one or more additional security keys (or otherwise secure communications between the device 1102 and MME 1104) using the security key K_ASME_D. The MME 1104 may then send an Attach Complete 1120 message to the device 1102.

An observation here is that if the device identifier and/or credentials (or a previously obtained/generated device keys) were stored in the HSS 1106 or another server in the network with a subscription identifier, then the device 1102 could use this flow to perform attachment. In order to do this there, the device 1102 may indicate (e.g., in the Attach Request 1108) that its device identifier and/or credentials may be obtained from the HSS 1106 or other network server. Alternatively, the MME 1104 may indicate to the device 1102 that the device_challenge is associated with a particular device identifier (e.g., by including the device identifier, such as IMEI, along with the device_challenge in some form). This way, the device 1102 can know that the device challenge (in the Authentication Request 1112) is associated with its device identifier.

Third Exemplary Method of Subscriber-Device Authentication

Figure 12:
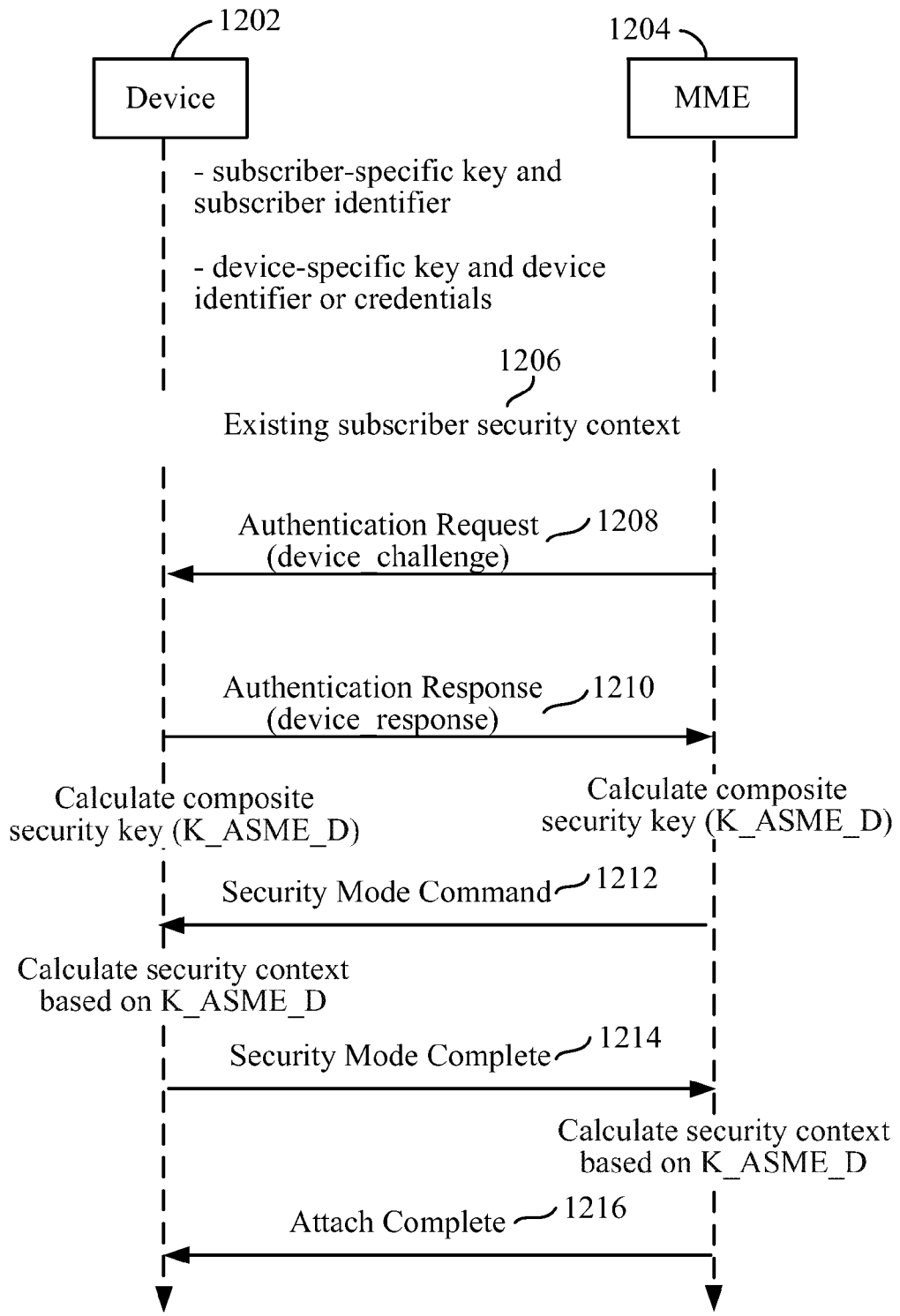
FIG. 12 illustrates a third exemplary method for generating a security key by binding subscriber and device authentication.

FIG. 12 illustrates a third exemplary method for generating a security key by binding subscriber and device authentication. In this example, subscriber authentication has been previously performed so a subscriber security context 1206 (e.g., K_ASME key) is already present. The combined subscriber and device authentication may be initiated by the network to replace the existing security context. This embodiment may be beneficial to devices that might need to establish an initial AKA-based security context in order to obtain a full fledged or operational credentials from the operator.

This approach assumes that the MME already knows device identifier (e.g., IMEI) and/or device_credentials.

The MME 1204 sends an Authentication Request 1208 to the device 1202 that includes a device_challenge. In response, the device 1202 sends an Authentication Response 1210 to the MME 1204 that includes a device response. The device_response may be based on the device_challenge and the device identifier and/or certificate. At this point, both the device 1202 and MME 1204 may have sufficient information to calculate a (composite) security key K_ASME_D (e.g., based on the AKA-based security context and device authentication information).

The MME 1204 may send a NAS Security Mode Command 1212 to the device 1202 to replace the existing security context 1206 to one based on the new security key K_ASME_D (e.g., which incorporates both subscriber authentication and device authentication). In response, the device 1202 may generate a new security context based on the security key K_ASME_D and may send a NAS Security Mode Complete 1214 message in response.

Note that while various examples herein illustrate that both subscriber authentication and device authentication may be performed via the MME, other network entities may perform some of these functions in combination with, or in place of, the MME.

One or more of the components, steps, features and/or functions illustrated in FIGS. 1, 2, 3, 4, 5, 6, 7, 8, 9, 10, 11, and/or 12 may be rearranged and/or combined into a single component, step, feature or function or embodied in several components, steps, or functions. Additional elements, components, steps, and/or functions may also be added without departing from the present disclosure. The apparatus, devices, and/or components illustrated in FIGS. 1, 5, 6 and/or 8 may be configured to perform one or more of the methods, features, or steps described in FIGS. 2, 3, 4, 7 and/or 9-12. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. A method operational in a device, comprising:
   performing subscriber authentication with a network entity based on a subscriber authentication key;
   performing device authentication of the device with the network entity to obtain device authentication data, wherein the device authentication data is obtained based on a challenge received by the device and on a device identity or credential, the device authentication data incorporating at least a portion of the challenge and wherein the device authentication data includes an encrypted parameter derived from a device temporary key, a network nonce and a device nonce;
   generating a security key based on the subscriber authentication key and at least a portion of the device authentication data to bind the subscriber authentication and the device authentication; and
   using the security key to secure communications between the device and a serving network.

2. The method of claim 1, wherein subscriber authentication is performed by a first authentication server that is part of the network entity, and device authentication is performed by a second authentication server that is part of the network entity.

3. The method of claim 1, wherein device authentication is performed by:
   receiving data from the network entity that is encrypted with a public key of the device;
   using a corresponding private key to decrypt the encrypted data; and
   subsequently proving to the network entity that the device has knowledge of the data.

4. The method of claim 1, further comprising:
   sending an attach request from the device to the network entity, the attach request including an indication that the device is capable of device authentication.

5. The method of claim 1, wherein device authentication is secured by at least one key generated during the subscriber authentication.

6. The method of claim 1, wherein subscriber authentication and device authentication are concurrently performed in message exchanges in which subscriber authentication and device authentication are combined.

7. The method of claim 1, wherein subscriber authentication is performed in an earlier and separate security exchange from the device authentication.

8. The method of claim 1, wherein the security key is generated as a function of at least a first key obtained from subscriber authentication and a second key obtained from device authentication.

9. The method of claim 1, wherein the device is a relay node that appears as an access terminal to the network entity and appears as a network device to one or more access terminals.

10. The method of claim 1, wherein the security key is separately generated by the device and the network entity.

11. The method of claim 1, further comprising:
    provisioning a subscriber-specific key as part of a service agreement, where the subscriber-specific key is used for the subscriber authentication; and
    provisioning a device-specific key in the device during manufacturing, where the device-specific key is used for the device authentication.

12. The method of claim 1, wherein the device authentication is performed subsequent to, or concurrently with, the subscriber authentication.

13. The method of claim 1, wherein the challenge includes an identifier and the method further includes:
    receiving a command from the network entity that includes the identifier; and
    generating additional security keys based on the security key and the identifier.

14. The method of claim 1, wherein the device authentication is performed subsequent to the subscriber authentication.

15. The method of claim 1, wherein the subscriber authentication is performed based on a subscriber authentication key obtained using a subscriber identity or key stored with the device.

16. A device, comprising:
    a communication interface; and
    a processing circuit coupled to the communication interface, the processing circuit adapted to:
      perform subscriber authentication with a network entity based on a subscriber authentication key;
      perform device authentication of the device with the network entity to obtain device authentication data, wherein the device authentication data is obtained based on a challenge received by the device and on a device identity or credential, the device authentication data incorporating at least a portion of the challenge and wherein the device authentication data includes an encrypted parameter derived from a device temporary key, a network nonce and a device nonce;
      generate a security key based on the subscriber authentication key and at least a portion of the device authentication data to bind the subscriber authentication and the device authentication; and
      use the security key to secure communications between the device and a serving network.

17. The device of claim 16, wherein device authentication is based on a challenge-response exchange between the device and the network entity.

18. The device of claim 16, wherein device authentication is performed by:
    receiving data from the network entity that is encrypted with a public key of the device;

using a corresponding private key to decrypt the encrypted data; and subsequently proving to the network entity that the device has knowledge of the data.

19. The device of claim 16, further comprising:
sending an attach request from the device to the network entity, the attach request including an indication that the device is capable of device authentication.

20. The device of claim 16, wherein device authentication is secured by at least one key generated during the subscriber authentication.

21. The device of claim 16, wherein subscriber authentication and device authentication are concurrently performed in combined message exchanges in which subscriber authentication and device authentication are combined.

22. The device of claim 16, wherein subscriber authentication is performed in an earlier and separate security exchange from the device authentication.

23. The device of claim 16, wherein the security key is generated as a function of at least a first key obtained from subscriber authentication and a second key obtained from device authentication.

24. The device of claim 16, wherein the device is a relay node that appears as an access terminal to the network entity and appears as a network device to one or more access terminals.

25. The device of claim 16, further comprising:
a removable storage device coupled to the processing circuit and storing a subscriber-specific key used for the subscriber authentication; and
a secure storage device coupled to the processing circuit and storing a device-specific key used for the device authentication.

26. A device, comprising:
means for performing subscriber authentication with a network entity based on a subscriber authentication key;
means for performing device authentication of the device with the network entity to obtain device authentication data, wherein the device authentication data is obtained based on a challenge received by the device and on a device identity or credential, the device authentication data incorporating at least a portion of the challenge and wherein the device authentication data includes an encrypted parameter derived from a device temporary key, a network nonce and a device nonce;
means for generating a security key based on the subscriber authentication key and at least a portion of the device authentication data to bind the subscriber authentication and the device authentication; and
means for using the security key to secure communications between the device and a serving network.

27. The device of claim 26, further comprising:
means for storing a subscriber-specific key used for the subscriber authentication; and
means for storing a device-specific key used for the device authentication.

28. A non-transitory processor-readable medium comprising instructions operational on a device, which when executed by a processor causes the processor to:
perform subscriber authentication with a network entity based on a subscriber authentication key;
perform device authentication of the device with the network entity to obtain device authentication data, wherein the device authentication data is obtained based on a challenge received by the device and on a device identity or credential, the device authentication data incorporating at least a portion of the challenge and wherein the device authentication data includes an encrypted parameter derived from a device temporary key, a network nonce and a device nonce;
generate a security key based on the subscriber authentication key and at least a portion of the device authentication data to bind the subscriber authentication and the device authentication; and
use the security key to secure communications between the device and a serving network.

29. A method operational in a network entity, comprising:
performing subscriber authentication with a device based on a subscriber authentication key;
performing device authentication of the device to obtain device authentication data, wherein the device authentication data is obtained based on a challenge sent to the device and on a device identity or credential, the device authentication data incorporating at least a portion of the challenge and wherein the device authentication data includes an encrypted parameter derived from a device temporary key, a network nonce and a device nonce;
generating a security key based on the subscriber authentication key and at least a portion of the device authentication data to bind the subscriber authentication and the device authentication; and
using the security key to secure communications between the network entity and the device.

30. The method of claim 29, wherein device authentication includes:
receiving a certificate from the device;
verifying the certificate associated with the device has not been revoked.

31. The method of claim 29, further comprising:
receiving an attach request from the device, the attach request including an indication that the device is capable of device authentication.

32. The method of claim 29, wherein device authentication is secured by at least one key generated during the subscriber authentication.

33. The method of claim 29, wherein subscriber authentication and device authentication are concurrently performed in combined message exchanges in which subscriber authentication and device authentication are combined.

34. The method of claim 29, wherein subscriber authentication is performed in an earlier and separate security exchange from the device authentication.

35. The method of claim 29, wherein the security key is generated as a function of at least a first key obtained from subscriber authentication and a second key obtained from device authentication.

36. The method of claim 29, wherein the security key is separately generated by the device and the network entity.

37. The method of claim 29, further comprising:
obtaining a subscriber-specific key as part of a service agreement, the subscriber-specific key used for the subscriber authentication; and
obtaining a device-specific key for the device, the device-specific key used for the device authentication.

38. The method of claim 29, wherein the device authentication is performed subsequent to, or concurrently with, the subscriber authentication.

39. The method of claim 29, wherein the challenge includes an identifier and the method further includes:
transmitting a command to the device that includes the identifier; and
receiving additional security keys generated by the device based on the security key and the identifier.

40. The method of claim 29, wherein the subscriber authentication is performed based on a subscriber authentication key obtained using a subscriber identity or key stored with the device.

41. A network entity, comprising:
a communication interface; and
a processing circuit coupled to the communication interface, the processing circuit adapted to:
perform subscriber authentication with a device based on a subscriber authentication key;
perform device authentication of the device to obtain device authentication data, wherein the device authentication data is obtained based on a challenge sent to the device and on a device identity or credential, the device authentication data incorporating at least a portion of the challenge and wherein the device authentication data includes an encrypted parameter derived from a device temporary key, a network nonce and a device nonce;
generate a security key based on the subscriber authentication key and at least a portion of the device authentication data to bind the subscriber authentication and the device authentication; and
use the security key to secure communications between the network entity and the device.

42. The network entity of claim 41, wherein the processing circuit is further adapted to:
receive an attach request from the device, the attach request including an indication that the device is capable of device authentication.

43. The network entity of claim 41, wherein device authentication is secured by at least one key generated during the subscriber authentication.

44. The network entity of claim 41, wherein subscriber authentication and device authentication are concurrently performed in combined message exchanges in which subscriber authentication and device authentication are combined.

45. The network entity of claim 41, wherein subscriber authentication is performed in an earlier and separate security exchange from the device authentication.

46. The network entity of claim 41, wherein the security key is generated as a function of at least a first key obtained from subscriber authentication and a second key obtained from device authentication.

47. The network entity of claim 41, further comprising:
obtaining a subscriber-specific key as part of a service agreement, the subscriber-specific key used for the subscriber authentication; and
obtaining a device-specific key for the device, the device-specific key used for the device authentication.

48. A network entity, comprising
means for performing subscriber authentication with a device based on a subscriber authentication key;
means for performing device authentication of the device to obtain device authentication data, wherein the device authentication data is obtained based on a challenge sent to the device and on a device identity or credential, the device authentication data incorporating at least a portion of the challenge and wherein the device authentication data includes an encrypted parameter derived from a device temporary key, a network nonce and a device nonce;
means for a security key based on the subscriber authentication key and at least a portion of the device authentication data to bind the subscriber authentication and the device authentication; and
means for using the security key to secure communications between the network entity and the device.

49. A non-transitory processor-readable medium comprising instructions operational on a network entity, which when executed by a processor causes the processor to:
perform subscriber authentication with a device based on a subscriber authentication key;
perform device authentication of the device to obtain device authentication data, wherein the device authentication data is obtained based on a challenge sent to the device and on a device identity or credential, the device authentication data incorporating at least a portion of the challenge and wherein the device authentication data includes an encrypted parameter derived from a device temporary key, a network nonce and a device nonce;
generate a security key based on the subscriber authentication key and at least a portion of the device authentication data to bind the subscriber authentication and the device authentication; and
use the security key to secure communications between the network entity and the device.

\* \* \* \* \*